(12) United States Patent
Ferguson

(10) Patent No.: US 12,241,728 B2
(45) Date of Patent: *Mar. 4, 2025

(54) SYSTEM AND METHOD FOR ADJUSTING THE TRAJECTORY OF AN ARROW

(71) Applicant: Pro-Tracker IP Holding, LLC, Rexburg, ID (US)

(72) Inventor: Michael D. Ferguson, Rexburg, ID (US)

(73) Assignee: Pro-Tracker IP Holding, LLC, Rexburg, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/214,153

(22) Filed: Jun. 26, 2023

(65) Prior Publication Data

US 2023/0332873 A1     Oct. 19, 2023

Related U.S. Application Data

(63) Continuation of application No. 16/280,884, filed on Feb. 20, 2019, now Pat. No. 11,686,563.

(51) Int. Cl.
 *F42B 6/04*     (2006.01)
 *F42B 12/38*    (2006.01)
 *G01S 19/19*    (2010.01)

(52) U.S. Cl.
 CPC ............ *F42B 12/385* (2013.01); *F42B 6/04* (2013.01); *G01S 19/19* (2013.01)

(58) Field of Classification Search
 CPC ............ F42B 6/04; F42B 6/06; F42B 12/362; F42B 12/365; F42B 12/385; G01S 19/19

USPC .................................................. 473/570, 578
 See application file for complete search history.

(56) References Cited

U.S. PATENT DOCUMENTS

| | | | |
|---|---|---|---|
| 81,270 | A | 8/1868 | Good et al. |
| 540,834 | A | 6/1895 | Gumm |
| 1,073,614 | A | 9/1913 | McDearmid |
| 1,493,165 | A | 5/1924 | Schade |
| 1,845,848 | A | 2/1932 | Richards |
| 1,853,294 | A | 4/1932 | Barnhart |
| 2,228,823 | A | 1/1941 | Helm |
| 2,289,284 | A | 7/1942 | Chandler |

(Continued)

FOREIGN PATENT DOCUMENTS

| | | |
|---|---|---|
| CA | 747692 | 6/1966 |
| CA | 3021779 | 3/2023 |

(Continued)

OTHER PUBLICATIONS

Bowhunter Magazine, Zwickey Scorpio, Nov. 1984. p. 113.

(Continued)

*Primary Examiner* — Alexander R Niconovich
(74) *Attorney, Agent, or Firm* — Clayton Howarth, P.C.

(57) ABSTRACT

A system and method of correcting the trajectory of a hunting arrow is disclosed and described. The arrow can include a compensator coupled to a shaft of the arrow and the compensator has diameter that is larger than a diameter of the shaft of the arrow. A thickness of the compensator, which is measured as the difference in the diameter of the compensator and the diameter of the shaft of the arrow, is configured to enable a user to aim the arrow with a bow that has been sighted for a standard arrow.

11 Claims, 31 Drawing Sheets

(56) References Cited

U.S. PATENT DOCUMENTS

| | | |
|---|---|---|
| 2,426,283 A | 8/1947 | Pearson |
| 2,457,793 A | 12/1948 | Bear |
| 2,514,638 A | 7/1950 | Grenier |
| 2,519,553 A | 8/1950 | Faulkner |
| 2,813,818 A | 11/1957 | Pearson |
| 2,907,327 A | 10/1959 | White |
| 2,925,278 A | 2/1960 | Sweetland |
| 2,989,310 A | 6/1961 | Lamond |
| 3,066,940 A | 12/1962 | De Lonais |
| 3,103,102 A | 9/1963 | Sargent et al. |
| 3,156,230 A | 11/1964 | Groves |
| 3,415,240 A | 12/1968 | Bear |
| 3,502,063 A | 3/1970 | Bear |
| 3,612,028 A | 10/1971 | Karbo |
| 3,632,920 A | 1/1972 | Tetrault |
| 3,638,181 A | 1/1972 | Bryant |
| 3,717,094 A | 2/1973 | Morrow |
| 3,738,348 A | 6/1973 | Karbo |
| 3,759,519 A | 9/1973 | Palma |
| 3,790,948 A * | 2/1974 | Ratkovich ............. F42B 12/385 455/100 |
| 3,814,075 A | 6/1974 | Hoyt, Jr. |
| 3,859,482 A | 1/1975 | Matsui et al. |
| 3,869,588 A | 3/1975 | Ubukata et al. |
| 3,893,866 A | 7/1975 | Hollingsworth |
| 3,921,598 A | 11/1975 | Helmick |
| 3,957,027 A | 5/1976 | Drake |
| 3,976,298 A | 8/1976 | Hinchman |
| 4,012,155 A | 3/1977 | Morris |
| 4,016,912 A | 4/1977 | St-Amour |
| 4,050,696 A | 9/1977 | Troncoso, Jr. |
| 4,093,230 A | 6/1978 | Simo |
| 4,093,836 A | 6/1978 | Ewy et al. |
| 4,166,619 A | 9/1979 | Bergmann et al. |
| 4,175,749 A | 11/1979 | Simo |
| 4,184,057 A | 1/1980 | Kumita et al. |
| 4,201,898 A | 5/1980 | Jones et al. |
| 4,203,601 A | 5/1980 | SImo |
| 4,230,322 A | 10/1980 | Bottelsen |
| 4,290,710 A | 9/1981 | Waller |
| 4,302,030 A | 11/1981 | Clay |
| 4,311,891 A | 1/1982 | Faust |
| 4,337,701 A | 7/1982 | Janson |
| 4,340,930 A | 7/1982 | Carissimi |
| 4,347,496 A | 8/1982 | Kubalak et al. |
| 4,371,763 A | 2/1983 | Jackman et al. |
| 4,405,133 A | 9/1983 | Cartwright, Jr. |
| 4,421,319 A | 12/1983 | Murphy |
| 4,448,183 A | 5/1984 | Quartino et al. |
| 4,452,222 A | 6/1984 | Quartino et al. |
| 4,494,521 A | 1/1985 | Quartino |
| 4,533,801 A | 8/1985 | Jackman et al. |
| 4,541,636 A | 9/1985 | Humphrey |
| 4,542,731 A | 9/1985 | Quartino |
| 4,574,766 A | 3/1986 | Izuta |
| 4,597,580 A | 7/1986 | Gassie |
| 4,613,763 A | 9/1986 | Swansen |
| 4,615,180 A | 10/1986 | Rudman |
| 4,651,999 A | 3/1987 | Sturm |
| 4,674,468 A | 6/1987 | Izuta |
| 4,675,683 A * | 6/1987 | Robinson ................. G01S 1/68 342/450 |
| 4,697,053 A | 9/1987 | Lockard |
| 4,700,692 A | 10/1987 | Baumgartner |
| 4,704,612 A | 11/1987 | Boy et al. |
| 4,744,347 A | 5/1988 | Dodge |
| 4,746,774 A | 5/1988 | Tetrault et al. |
| 4,749,198 A | 6/1988 | Brailean |
| 4,815,320 A | 3/1989 | Allen et al. |
| 4,815,381 A | 3/1989 | Bullard |
| 4,819,608 A | 4/1989 | Filice et al. |
| 4,836,557 A | 6/1989 | Polando |
| 4,846,142 A | 7/1989 | Tone |
| 4,858,935 A * | 8/1989 | Capson ................. F42B 12/385 473/578 |
| 4,873,401 A | 10/1989 | Ireland |
| 4,885,800 A | 12/1989 | Ragle |
| 4,899,956 A * | 2/1990 | King ........................ G05D 1/12 102/293 |
| 4,905,397 A | 3/1990 | Juelg, Jr. |
| 4,932,260 A | 6/1990 | Norton |
| 4,940,245 A | 7/1990 | Bittle, Jr. |
| 4,951,952 A | 8/1990 | Saddler |
| 4,957,094 A | 9/1990 | Pickering et al. |
| RE33,470 E | 12/1990 | Boy et al. |
| 4,976,442 A * | 12/1990 | Treadway ............. F42B 12/385 473/578 |
| 5,022,658 A | 6/1991 | Burkhart |
| 5,024,447 A | 6/1991 | Jude |
| 5,025,774 A | 6/1991 | Martin |
| 5,037,234 A | 8/1991 | De Jong |
| 5,092,052 A | 3/1992 | Godsey |
| 5,141,229 A | 8/1992 | Roundy |
| 5,143,380 A | 9/1992 | Maleski |
| 5,143,500 A | 9/1992 | Schuring et al. |
| 5,157,405 A * | 10/1992 | Wycoff ................. F42B 12/385 473/578 |
| 5,167,417 A | 12/1992 | Stacey et al. |
| 5,188,373 A * | 2/1993 | Ferguson ............... F42B 12/385 473/578 |
| 5,291,874 A | 3/1994 | Harrison |
| 5,443,272 A | 8/1995 | Vincent, Sr. |
| 5,446,467 A * | 8/1995 | Willett ...................... G01S 1/02 473/578 |
| 5,450,614 A * | 9/1995 | Rodriguez ............. F42B 12/385 455/66.1 |
| 5,491,325 A | 2/1996 | Huang et al. |
| 5,496,041 A | 3/1996 | Broussard |
| 5,570,675 A | 11/1996 | Treadway |
| D394,085 S | 5/1998 | Leedy |
| 6,017,284 A | 1/2000 | Giles |
| 6,027,421 A | 2/2000 | Adams, Jr. |
| 6,179,736 B1 | 1/2001 | Thurber |
| 6,238,310 B1 | 5/2001 | Morrison |
| 6,251,036 B1 | 6/2001 | Wu et al. |
| 6,276,351 B1 | 8/2001 | Treadway |
| 6,409,617 B1 | 6/2002 | Armold |
| 6,431,162 B1 | 8/2002 | Mizek et al. |
| 6,520,876 B1 | 2/2003 | Eastman, II |
| 6,554,726 B2 | 4/2003 | Thurber |
| 6,612,947 B2 * | 9/2003 | Porter ................... F42B 12/385 473/578 |
| 6,764,420 B2 * | 7/2004 | Cyr ........................... F42B 6/06 473/578 |
| 6,814,678 B2 * | 11/2004 | Cyr ........................... F42B 6/06 473/578 |
| 6,821,219 B2 | 11/2004 | Thurber |
| 6,856,250 B2 * | 2/2005 | Hilliard ................. G01S 13/758 340/573.2 |
| 6,866,599 B2 | 3/2005 | Eastman, II |
| 7,201,818 B2 | 4/2007 | Eastman, II |
| 7,232,389 B2 * | 6/2007 | Monteleone ............ F42B 12/40 473/578 |
| 7,300,367 B1 * | 11/2007 | Andol ....................... F42B 6/04 473/578 |
| D556,612 S | 12/2007 | Beecher et al. |
| 7,331,887 B1 * | 2/2008 | Dunn ..................... F42B 12/385 473/578 |
| 7,493,815 B1 | 2/2009 | Younis |
| 7,608,002 B2 | 10/2009 | Eastman, II et al. |
| 7,632,199 B2 * | 12/2009 | Kikos .................... F42B 12/385 473/578 |
| 7,909,714 B2 | 3/2011 | Cyr et al. |
| 7,955,201 B2 | 6/2011 | Harwath et al. |
| 8,075,430 B1 * | 12/2011 | Hester ................... F42B 12/385 473/578 |
| 8,088,028 B2 * | 1/2012 | Jones .................... F42B 12/385 473/578 |
| 8,105,189 B1 | 1/2012 | Huang |
| 8,192,309 B1 * | 6/2012 | Roberts ................. F42B 12/385 473/578 |
| 8,216,097 B2 * | 7/2012 | Nick ...................... F42B 12/385 473/578 |

(56) References Cited

U.S. PATENT DOCUMENTS

| | | | |
|---|---|---|---|
| 8,221,273 B2 | 7/2012 | Donahoe | |
| 8,256,291 B1 | 9/2012 | Younis | |
| 8,323,132 B2 * | 12/2012 | Kirsch | F42B 12/385 |
| | | | 473/578 |
| 8,337,341 B1 | 12/2012 | Huang | |
| 8,337,342 B1 | 12/2012 | Huang | |
| 8,353,455 B1 | 1/2013 | Huang | |
| 8,388,473 B2 | 3/2013 | Smith | |
| 8,393,982 B2 | 3/2013 | Ferguson | |
| 8,403,777 B1 | 3/2013 | Huang | |
| 8,425,354 B2 | 4/2013 | Ferguson | |
| 8,529,383 B2 | 9/2013 | Donahoe | |
| 8,590,522 B2 | 11/2013 | Khoshnood et al. | |
| 8,608,531 B1 | 12/2013 | Huang | |
| 8,668,605 B1 | 3/2014 | Huang | |
| 8,821,325 B2 | 9/2014 | Kirsch | |
| D717,389 S | 11/2014 | Huang | |
| 8,875,687 B1 | 11/2014 | Huang et al. | |
| 8,951,152 B1 | 2/2015 | Huang | |
| 8,952,808 B2 * | 2/2015 | Steinman | G08C 19/00 |
| | | | 340/8.1 |
| 8,967,133 B1 | 3/2015 | Huang | |
| 8,974,326 B2 | 3/2015 | Ferguson | |
| 9,030,296 B2 | 5/2015 | Steinman et al. | |
| 9,046,452 B1 | 6/2015 | Huang | |
| 9,075,124 B2 * | 7/2015 | Zusman | G01S 3/40 |
| 9,097,486 B1 | 8/2015 | Huang | |
| 9,115,953 B1 | 8/2015 | Huang | |
| 9,212,875 B1 | 12/2015 | Huang | |
| 9,303,962 B1 | 4/2016 | Burnworth et al. | |
| 9,395,166 B1 | 7/2016 | Huang | |
| 9,417,041 B2 | 8/2016 | Ferguson | |
| 9,441,927 B1 | 9/2016 | Huang | |
| 9,557,148 B2 | 1/2017 | Ledbetter | |
| 9,631,908 B2 | 4/2017 | Park | |
| 9,752,842 B1 | 9/2017 | Huang | |
| 9,752,844 B1 | 9/2017 | Huang | |
| 9,759,510 B1 | 9/2017 | Kempf et al. | |
| 9,797,723 B1 | 10/2017 | Huang | |
| 9,803,963 B1 | 10/2017 | Huang | |
| 9,816,815 B1 | 11/2017 | Huang | |
| 9,909,833 B1 | 3/2018 | Huang | |
| 9,915,510 B1 * | 3/2018 | Huang | F42B 6/08 |
| 9,982,975 B1 | 5/2018 | Huang | |
| 10,018,454 B2 | 7/2018 | Ferguson | |
| 10,099,889 B1 | 10/2018 | Huang | |
| 10,145,643 B1 | 12/2018 | Huang | |
| 10,215,521 B1 | 2/2019 | Huang | |
| 10,232,581 B1 | 3/2019 | Huang | |
| 10,240,886 B1 | 3/2019 | Huang | |
| 10,359,254 B1 | 7/2019 | Kempf et al. | |
| 10,371,480 B1 | 8/2019 | Huang | |
| 10,386,152 B1 | 8/2019 | Huang | |
| 10,415,924 B1 | 9/2019 | Huang | |
| 10,421,637 B1 | 9/2019 | Huang | |
| 10,458,743 B1 | 10/2019 | Kempf et al. | |
| 10,837,738 B1 | 11/2020 | Huang | |
| 10,859,354 B1 | 12/2020 | Huang | |
| 10,871,356 B2 | 12/2020 | Ferguson | |
| 10,871,357 B2 | 12/2020 | Ferguson | |
| 10,948,257 B1 | 3/2021 | Huang et al. | |
| 10,969,210 B2 | 4/2021 | Ferguson | |
| 11,022,413 B1 | 6/2021 | Broderick | |
| 11,047,658 B2 | 6/2021 | Ferguson et al. | |
| 11,098,994 B1 * | 8/2021 | Huang | F42B 6/08 |
| 11,428,518 B2 * | 8/2022 | Hawkins | F42B 12/40 |
| 11,525,646 B1 | 12/2022 | Huang | |
| 11,686,563 B2 * | 6/2023 | Ferguson | F42B 12/385 |
| | | | 473/570 |
| 11,747,117 B1 | 9/2023 | Ferguson | |
| 2003/0132846 A1 | 7/2003 | Hilliard | |
| 2003/0176245 A1 | 9/2003 | Cyr et al. | |
| 2007/0105668 A1 | 5/2007 | Kikos | |
| 2008/0176681 A1 | 7/2008 | Donahoe | |
| 2009/0062042 A1 | 3/2009 | Huang et al. | |
| 2009/0291785 A1 | 11/2009 | Smith | |
| 2010/0035709 A1 * | 2/2010 | Russell | F42B 12/385 |
| | | | 473/578 |
| 2010/0248871 A1 | 9/2010 | Nick et al. | |
| 2011/0201464 A1 | 8/2011 | Ferguson | |
| 2012/0220399 A1 | 8/2012 | Ferguson | |
| 2016/0334191 A1 | 11/2016 | Schweyen | |
| 2017/0052007 A1 | 2/2017 | Syverson et al. | |
| 2017/0131077 A1 | 5/2017 | Ferguson | |
| 2017/0314898 A1 | 11/2017 | Syverson et al. | |
| 2018/0238666 A1 | 8/2018 | Ferguson | |
| 2019/0331469 A1 | 10/2019 | Ferguson | |
| 2020/0041241 A1 | 2/2020 | Ferguson | |
| 2020/0173762 A1 | 6/2020 | Ferguson et al. | |
| 2020/0263964 A1 | 8/2020 | Ferguson | |

FOREIGN PATENT DOCUMENTS

| | | |
|---|---|---|
| FR | 487413 | 11/1917 |
| FR | 1022401 | 7/1950 |
| FR | 002689228 | 10/1993 |
| GB | 114274 | 3/1918 |
| GB | 635439 | 4/1950 |
| GB | 1430790 | 4/1976 |
| GB | 001590954 | 6/1981 |
| SU | 001675649 | 9/1991 |
| WO | WO2012115673 | 8/2012 |
| WO | WO2019209388 | 10/2019 |

OTHER PUBLICATIONS

1986 Saunders Successories Catalog. Arrow Penetration Limiter. Jul. 1986. p. 9.

Arrow Dynamics Cutting Edge Arrow Design Home Products and Contact webpage https://www.tradgang.com/ad/products.html Jan. 5, 2021.

Double Splined Arrows Crossbow Nation Forum https://www.crossbownationa.com/community/threatds/double-splined-ar. Posted Aug. 16, 2017.

Top 10 Best Carbon Arrows for Hunting in 2020: Reviews and Guide https://safariors.com/best-carbon-arrows-hunting/ Last Updated on Apr. 26, 2020.

ArrowTrade Magazine, May 1997, advertisement for Gold Tip.

Arrow Trade Magazine, Jan. 1998, advertisement for Carbon Tech, Inc., p. 32.

Lamiglas Incorporated, Jan. 18, 1978, Dealer Price for Graphite Hunting Arrow Shaft and Graphite Stabilizers.

Lamiglas shaft specs, Aug. 14, 1978.

Letter from Lamiglas to Mr. Joe Schnell, dated Aug. 28, 1986 regarding Arrow Shaft Manufacturing Equipment List.

Letter from RESCO, Inc. to Martin Archery, dated Jun. 27, 1994.

Letter from RESCO, Inc. to Ed Schlice, dated Apr. 7, 1998.

Cabela's SST Graphite, "The Ultimate Hunting Arrow".

Graphite, The ultimate arrow sent from Lamiglas Mar. 12, 2001.

Arrow Dynamics Brochure, "Looks Like a Dart, Shoots Like a Dart Arrows", 2000-2001.

* cited by examiner

SYSTEM AND METHOD FOR ADJUSTING THE TRAJECTORY OF AN ARROW

CROSS-REFERENCE TO RELATED APPLICATIONS

This application is a continuation of U.S. patent application Ser. No. 16/280,884, filed Feb. 20, 2019, which is hereby incorporated by reference herein in its entirety, including but not limited to those portions that specifically appear hereinafter, the incorporation by reference being made with the following exception: In the event that any portions of the above-referenced application is inconsistent with this application, this application supercedes the above-referenced applications.

STATEMENT REGARDING FEDERALLY SPONSORED RESEARCH AND DEVELOPMENT

Not Applicable.

BACKGROUND

This disclosure relates generally to hunting arrows, and more particularly, but not necessarily entirely, to a hunting arrow having a transmitter, located either on or within the arrow to enable a bow hunter to locate the arrow after a missed shot, or the wounded animal after a successful shot independent of the ultimate location of the arrow itself. This disclosure also relates to devices used to compensate for the added weight of a tracking device, by manipulating the trajectory of the arrow.

The bow hunting of big game animals is a popular sport, particularly in the United States. White-tailed deer, mule deer, elk, antelope and bear are only a few of the species currently being hunted. State-of-the-art hunting arrows are typically made of fiberglass, aluminum, carbon reinforced plastic or composite materials and are provided with a removable and interchangeable tip, or "broadhead." The type, size, weight, etc., of a broadhead may be changed depending upon the animal being hunted, the weather conditions, the terrain, etc. The arrow itself varies in length depending upon the person shooting and the draw length of the bow. It ranges from 14" to 31", or longer. The length of the arrow varies mainly according to the draw length of the bow (which depends on the calibration of the bow and the person shooting it (for a compound bow) or the length of the bow (which varies according to the person shooting it) (for a longbow or recurve bow). It also depends on the type of tip being used (often a broadhead in hunting), the experience of the person shooting, and the bow itself. The arrow also can vary in diameter: Many archery target shooting organizations allow arrows up to 10.7 mm in diameter, while some allow only arrows up to 9.3 mm in diameter. Most hunting arrows, however, have significantly smaller diameters, to allow for less wind resistance and to decrease the effect a cross wind might have on a shot. Most standard carbon hunting arrows today have a diameter of 6.5 mm, while some are as small as 4 mm in diameter. Such arrows are quite expensive, typically ranging in price from $10.00 to $50.00 apiece.

Two distinct problems are common with bow hunters: (1) locating the arrow resulting from a missed shot and (2) locating the injured animal (if an immediate kill is not made) resulting from a successful shot. Even the best of hunters miss their target about 20-25% of the time and less experienced hunters even more. When shooting from a range of 50-100 yards, it is not uncommon to lose the arrows resulting from errant shots. A typical hunter may lose 10-20 arrows per year, resulting in substantial financial loss and frustration. Even more importantly, however, the loss of game resulting from successful shots is significant. While it is possible to drop a smaller animal immediately with a well-placed shot, larger animals such as deer, elk, bear, etc., are seldom instantly killed by an arrow. Whether the arrow passes completely through the animal or remains imbedded therein, the animal may continue to run from a few hundred yards up to many miles before either dying or resting, often evading the best tracking efforts of the hunter. This results in the loss of many wounded animals, which is a great disappointment to the hunter, as well as a waste of natural resources.

Hunting arrows have been developed which contain transmitters, enabling the bow hunter with a receiving unit to locate either the arrow after an errant shot, or the quarry after a successful shot, presuming the arrow remains imbedded in the quarry. However, while these arrows have addressed the problem of errant shots and successful shots, where the arrow remains imbedded in the quarry, in a significant number of cases of successful shots in relatively smaller animals (such as white-tail deer) the arrow passes completely through the animal, severely injuring but not necessarily immediately incapacitating it. Moreover, imbedded arrows are usually broken off against trees, rocks, etc., or even pulled out by the injured animal. In such cases the animal may run a substantial distance before dying, making it quite difficult to find, if one of these previously available arrows is utilized.

Hunting arrows have also been developed which contain transmitters which can separate from the arrow and attach themselves to the quarry to avoid some of the problems discussed above. Typically, these transmitters are expensive, but their cost can be offset by reusing the transmitters multiple times. However, certain components associated with these detachable transmitters are prone to breakage rendering these expensive transmitters useless and a financial loss.

Another serious problem that must be considered when adding extra weight to an arrow, (such as a transmitter, etc.), is how the extra weight affects the performance of the arrow. In general, it is desirable to add the least amount of weight possible to the arrow to maintain the performance of the arrow but still accommodate a tracking transmitter. Such problem has been unrecognized by the previous tracking devices. For example, a heavy arrow will travel slower than a lighter arrow and tend to "drop" more quickly over a given distance as compared to the lighter arrow. Thus, a lightweight transmitter assembly, and lightweight structures associated with the transmitter, have been considered to be highly desirable to help maintain the performance of the arrow with the concomitant problems regarding signal strength power, battery life and the durability of the transmitter.

The previously available devices are thus characterized by several disadvantages that are addressed by the disclosure. The disclosure minimizes, and in some aspects eliminates, the above-mentioned failures, and other problems, by utilizing the methods and structural features described herein. For example, the detachable transmitter assembly disclosed herein significantly reduces the loss of wounded animals by allowing the hunter to track and locate the wounded animal. This allows the hunter to hunt more efficiently and thereby reduces the waste of natural resources.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out herein.

SUMMARY OF THE DISCLOSURE

One illustrative embodiment of the present disclosure may comprise a hunting arrow including an arrow shaft with a preformed chamber inside of the arrow shaft. The chamber has an access window, a compression fitting surface at one end of the chamber and a chamber angled surface at the other end of the chamber. The hunting arrow also includes a signal generating transmitter having a compression fitting at one end of the transmitter and an angled surface at the other end of the transmitter. The transmitter can also have at least one barbed hook attached to the transmitter.

Another illustrative embodiment of the present disclosure may comprise a hunting arrow including an arrow shaft with a hollow distal end and a chamber access window in the shaft. The hunting arrow also has a chamber insert that is inserted into the hollow end of the shaft. The chamber insert has an access window, a compression fitting surface at one end of the chamber insert, and a chamber insert angled surface at the other end of the chamber insert. The hunting arrow also includes a signal generating transmitter having a compression fitting at one end of the transmitter and an angled surface at the other end of the transmitter. The transmitter also has at least one barbed hook attached to the transmitter.

A further illustrative embodiment of the present disclosure may comprise a hunting arrow including an arrow shaft with a threaded distal end and a chamber access window in the shaft. The illustrative embodiment also has a chamber attachment that is inserted into or threaded onto the end of the shaft. The chamber attachment has an access window, a compression fitting surface at one end of the chamber attachment, and a chamber attachment angled surface at the other end of the chamber attachment. The hunting arrow also includes a signal generating transmitter having a compression fitting at one end of the transmitter and an angled surface at the other end of the transmitter. The transmitter also has at least one barbed hook attached to the transmitter.

In yet a further illustrative embodiment of the present disclosure, a method of tracking a target animal is disclosed whereby a hunting arrow (according to any one of the above descriptions) is provided to an operator who inserts the transmitter into the chamber with sufficient force to engage the chamber compression fitting surface with the transmitter compression fitting such that the transmitter is securely attached within the chamber. The operator then shoots the arrow at a target animal and tracks the animal using a suitable receiver to receive the signals generated by the transmitter to locate the animal.

Yet another illustrative embodiment of the present disclosure may comprise a hunting arrow including an arrow shaft with a threaded distal end and a chamber access window in the shaft. The embodiment also has a chamber attachment that is inserted into or threaded onto the end of the shaft. The chamber attachment has an access window leading to a chamber. The hunting arrow also includes a transmitter housing having a signal generating transmitter housed therein. The transmitter housing has an animal engagement member, such as at least one barbed hook, extending therefrom. The transmitter housing may be installed into the chamber in the chamber attachment. A pair of shear pins may secure the transmitter housing in the chamber.

In a yet further illustrative embodiment of the present disclosure, a method of tracking a target animal is disclosed whereby a hunting arrow (according to any one of the above descriptions) is provided to an operator who inserts a transmitter housing into a chamber formed in the end of an arrow shaft. The operator may then secure the housing in the chamber using one or more shear pins that are installed in bores in the arrow shaft and the housing. When the arrow penetrates the target animal, an animal engagement member, such as a barbed hook, engages the hide of the animal. The engagement of the animal engagement member causes the transmitter housing to rapidly decelerate. The rapid deceleration shears the pins securing the housing allowing the housing to be ejected from the chamber as the arrow continues through the animal. The transmitter housing remains affixed to the animal hide. The transmitter in the housing broadcasts its location such that the wounded target may be easily found.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1A:
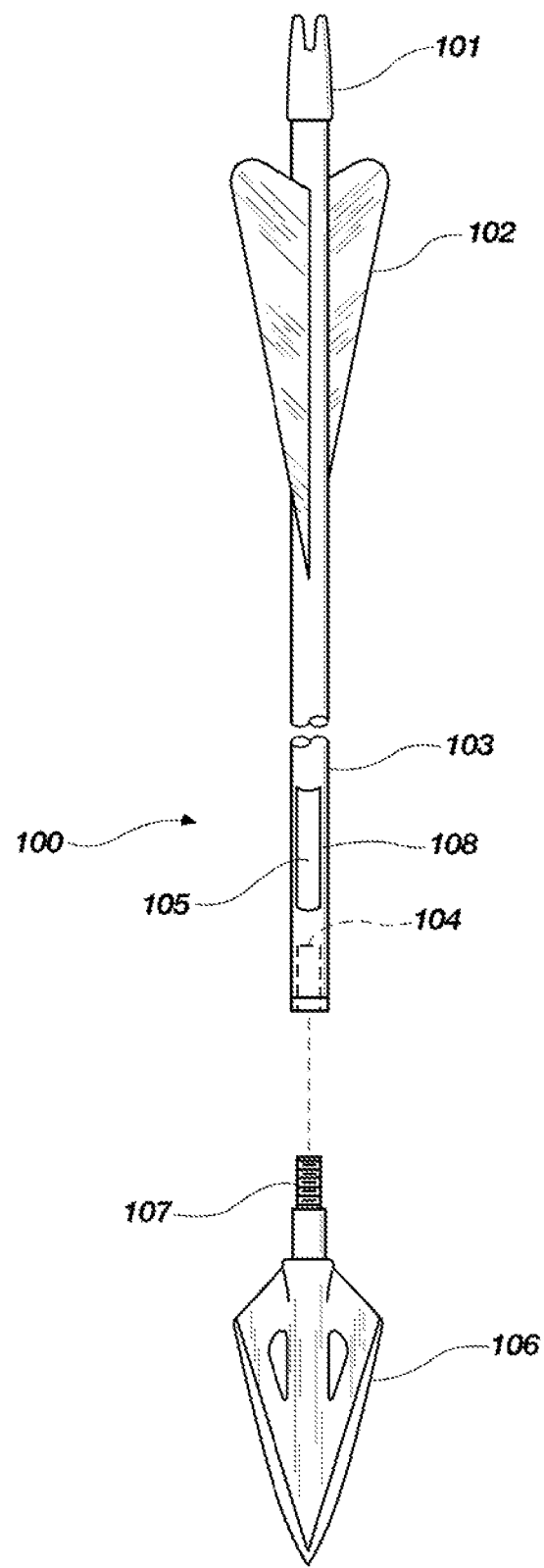
FIG. 1A is a plan view, in partial sectional view, of a hunting arrow made in accordance with the teachings and principles of the disclosure.

For the purposes of promoting an understanding of the principles in accordance with this disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the devices, systems, processes and methods will be disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular illustrative embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a", "an", and "the" include plural referents unless the context clearly dictates otherwise.

As used herein, the terms "comprising," "including," "containing," "characterized by," "having" and grammatical equivalents thereof are inclusive or open-ended terms that do not exclude additional, unrecited elements or method steps.

As used herein, the term "snap-fit connection" refers to the engagement or assembly of two members through deformation or deflection of at least one of the members. Once installed, the deformed or deflected member may return to its original shape.

As used herein, the term "proximal" shall refer broadly to the concept of a nearest portion. For example, the end of the arrow comprising fletching is the proximal-most portion of the arrow, because it is the nearest portion to the shooter as the arrow is traveling toward a target.

As used herein, the term "distal" shall generally refer to the opposite of proximal, and thus to the concept of a further portion, or a furthest portion, depending upon the context.

As used herein, the phrase "in an at least partially proximal-to-distal direction" shall refer generally to a two-dimensional concept of direction in which the "proximal-to-distal" direction defines one direction or dimension. An item that extends in a non-parallel direction with respect to the "proximal-to-distal" direction, that is, at a non-straight angle thereto, thereby involves two components of direction, one of which is in the "proximal-to-distal" direction and the other being in a direction orthogonal to the "proximal-to-distal" direction.

Figure 1B:
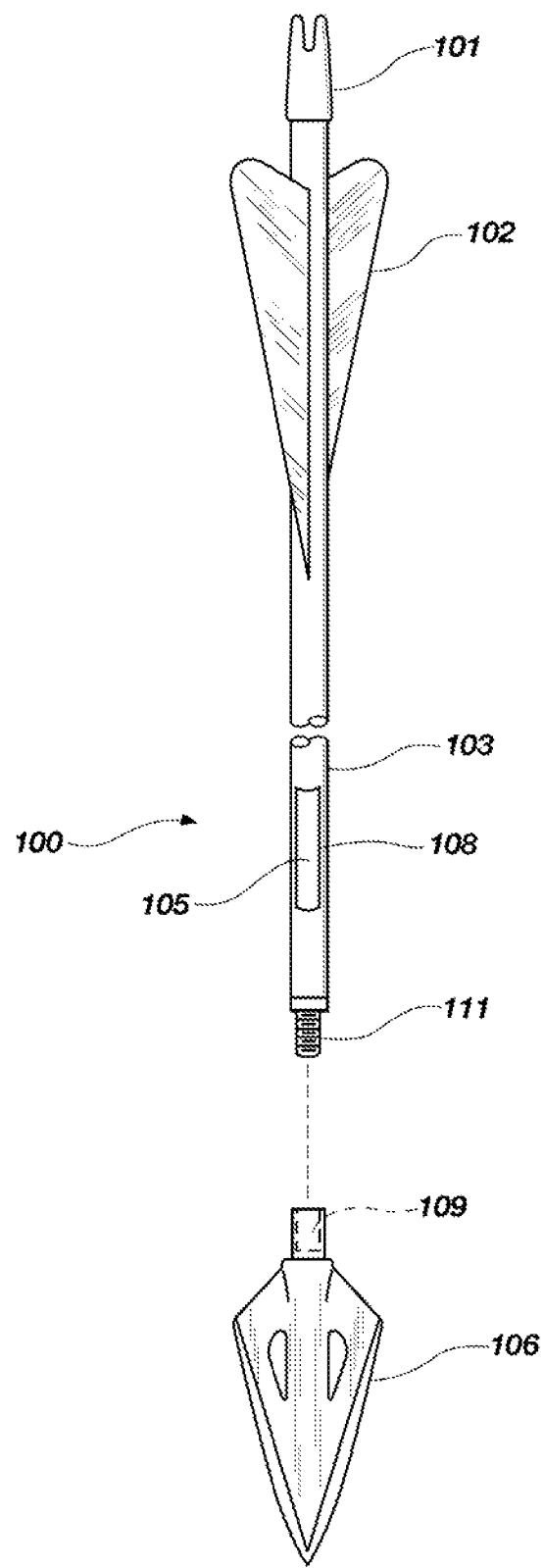
FIG. 1B is a plan view, in partial sectional view, of a hunting arrow made in accordance with the teachings and principles of the disclosure.

FIGS. 1A and 1B illustrate a hunting arrows generally designated 100, having a broadhead 106, shaft 103, nock 101 and fletchings 102. As illustrated in FIG. 1A, the broadhead 106 can be removably affixed to shaft 103 to permit the interchange of various broadheads depending upon the particular conditions. For instance, the broadhead 106 as shown in FIG. 1A may be affixed as by screwing the broadhead 106 with threaded male member 107 into threaded female plug 104 affixed in the forward-most end of shaft 103. Alternatively, the broadhead 106 as shown in FIG. 1B may be affixed as by screwing the broadhead 106 with internally female threaded plug 107 onto threaded male member 111 protruding from the forward-most end of shaft 103. In one embodiment of the disclosure, the shaft 103 of arrow 100 is hollow and comprises a chamber 105 that is accessible via a chamber access window 108 and configured to receive a suitable transmitter housing (not explicitly shown in FIG. 1A or 1B. The window 108 may be cut into the shaft 103. The chamber 105 and chamber window 108 may also simply be milled or formed into the arrow 100 during production.

Figure 2:
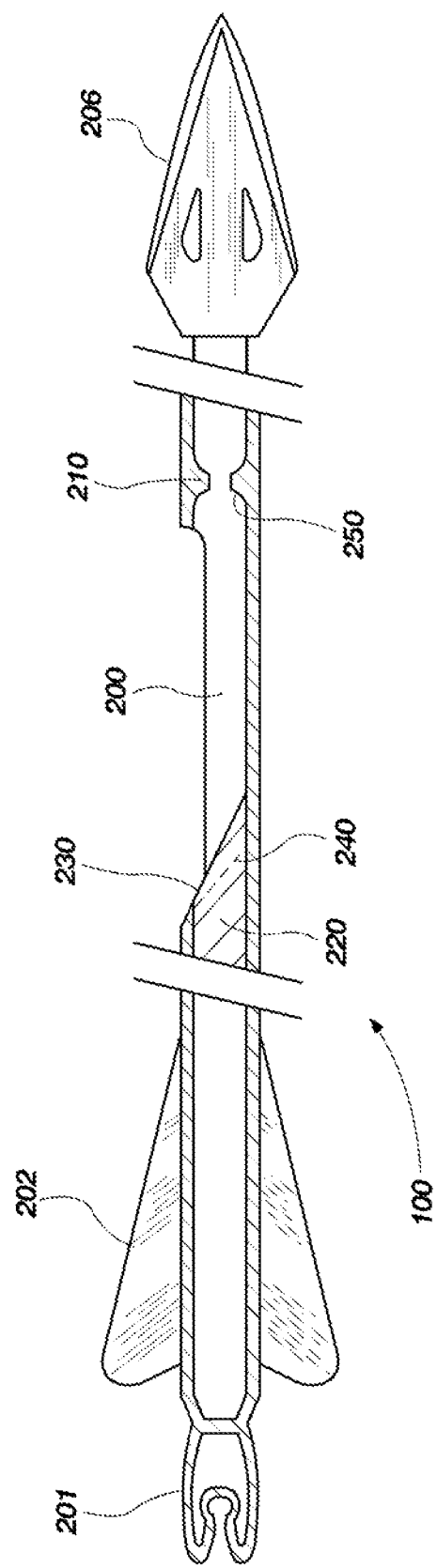
FIG. 2 is an enlarged partial sectional view of the hunting arrow of FIG. 1A or 1B made in accordance with the teachings and principles of the disclosure.

FIG. 2 shows an enlarged partial sectional view of the hunting arrow 100 revealing greater detail of an embodiment of the inside of chamber 200 which is configured to receive a suitable transmitter housing (not explicitly shown in the figure). The distal end of chamber 200 comprises a ramp 220 which underlies a rearward portion of the access window 230. The ramp 220 is secured within the arrow 100, as with adhesive, by friction or other means well-known to those skilled in the art. The ramp 220 can also be molded or integrally formed within the arrow 100 during production. The ramp surface 240 of the ramp 220 can assume a flat, concave or convex shape. Preferably, the ramp surface 240 is concave, rounded, and adapted to receive a correspondingly shaped convex transmitter housing (not explicitly shown in the figure) to help retain and guide the transmitter housing during ejection of the transmitter housing from the chamber 200. The forward portion of chamber 200 can have one or more projections or lips 210 to help retain a suitable transmitter housing within chamber 200 while the arrow 100 is in flight. It will be appreciated that the lips 210 are an engagement member. The lips 210 can also have ramping surfaces 250 on one or both sides of the lips 210 to help facilitate transmitter housing insertion and removal. Ramping surfaces 250 can be flat, concave or convex and can be secured within the arrow, as with adhesive, by friction or other means well-known to those skilled in the art. Ramping surfaces 250 can also be molded or integrally formed within the chamber 200 during production of the arrow 100.

Figure 3:
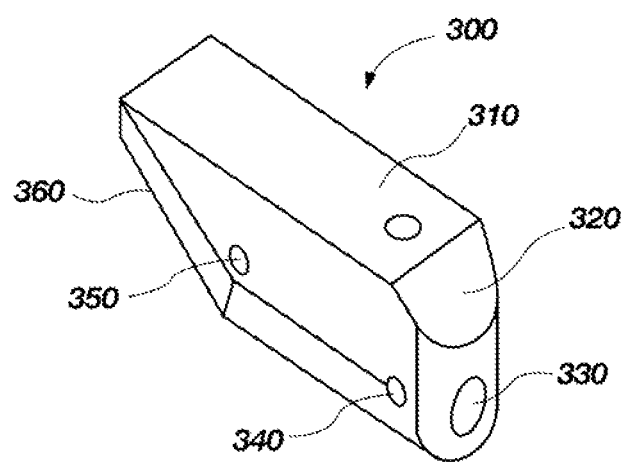
FIG. 3 is a perspective view of a transmitter body made in accordance with the teachings and principles of the disclosure.

FIGS. 3-6 show various views of an illustrative embodiment of a transmitter housing 300 for use with the arrow 100 of FIGS. 1 and 2. FIG. 3 illustrates a perspective view of transmitter housing 300 and FIGS. 4, 5 and 6 each show a left side view, front view and rear view of transmitter housing 300, respectively.

With reference to FIG. 3, in an illustrative embodiment of the present disclosure, the transmitter housing 300 is adapted to contain a radio transmitter (not explicitly shown in the figure) within the housing. The radio transmitter may be utilized to transmit radio frequency signals that may be utilized to determine the location of the transmitter housing 300. In an illustrative embodiment of the present disclosure, the transmitter housing 300 may include a battery (not explicitly shown in the figure) for powering the radio transmitter in the housing 300. In an illustrative embodiment of the present disclosure, the transmitter housing 300 may further comprise a GPS receiver that may be utilized to receive location information that may be transmitted by a transmitter in the housing 300. For purposes of this disclosure, the transmitter housing 300 may also be referred to as "transmitter assembly" or simply "transmitter." The transmitter housing 300 may be made from a relatively strong, lightweight material, such as plastic, resin, composite materials or the like. Transmitter housing 300 has top surface 310, transmitter ramp surface 360 and top-forward surface 320, as seen in FIG. 3. Additionally, the transmitter housing 300 can have front bore hole 330 and side bore holes 340 and 350 for receiving additional parts, as will be discussed in further detail below.

Figure 4:
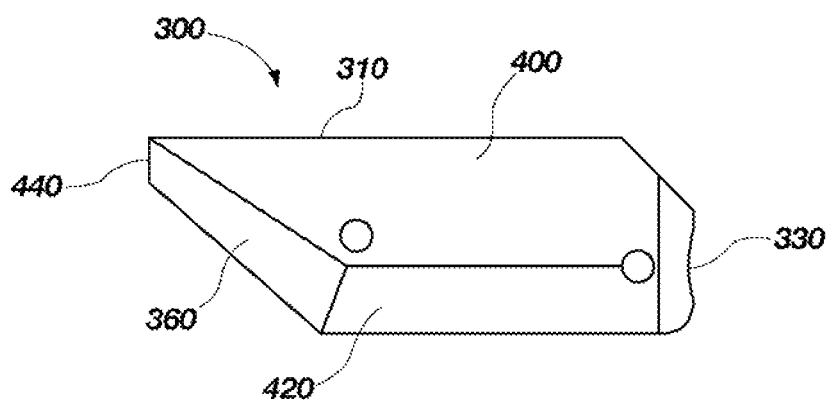
FIG. 4 is a side view of the transmitter body of FIG. 3 made in accordance with the teachings and principles of the disclosure.
Figure 5:
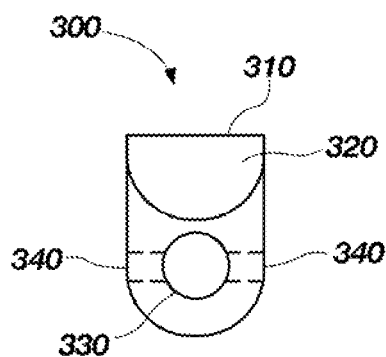
FIG. 5 is a front view of the transmitter body of FIG. 3 made in accordance with the teachings and principles of the disclosure.
Figure 6:
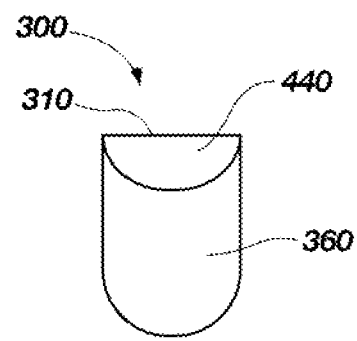
FIG. 6 is a rear view of the transmitter body of FIG. 3 made in accordance with the teachings and principles of the disclosure.

FIG. 4 shows a left side view of transmitter 300, including: left surface 400, rear surface 440, transmitter ramp surface 360 and bottom surface 420. Transmitter ramp surface 360 may be shaped to complement the ramp surface 240 of chamber 200 (see FIG. 2). For example, if the chamber ramp surface 240 is rounded and concave, then it is preferable that the transmitter ramp surface 360 be rounded and convex to conform to the shape of the chamber ramp surface 240. Likewise, if the bottom of chamber 200 is rounded and concave, then it is preferable that the bottom surface 420 of transmitter housing 300 be rounded and convex to conform to the shape of the bottom of the chamber 200. With reference to FIG. 5, showing a front view of the transmitter housing 300 of FIG. 3, it can be seen that bore holes 340 extend all of the way through transmitter body 300 to secure parts to transmitter body 300, as will be discussed in further detail below. FIG. 6 shows a rear view of the transmitter body of FIG. 3, illustrating the transmitter ramp surface 360 and the rear surface 440.

Figure 7:
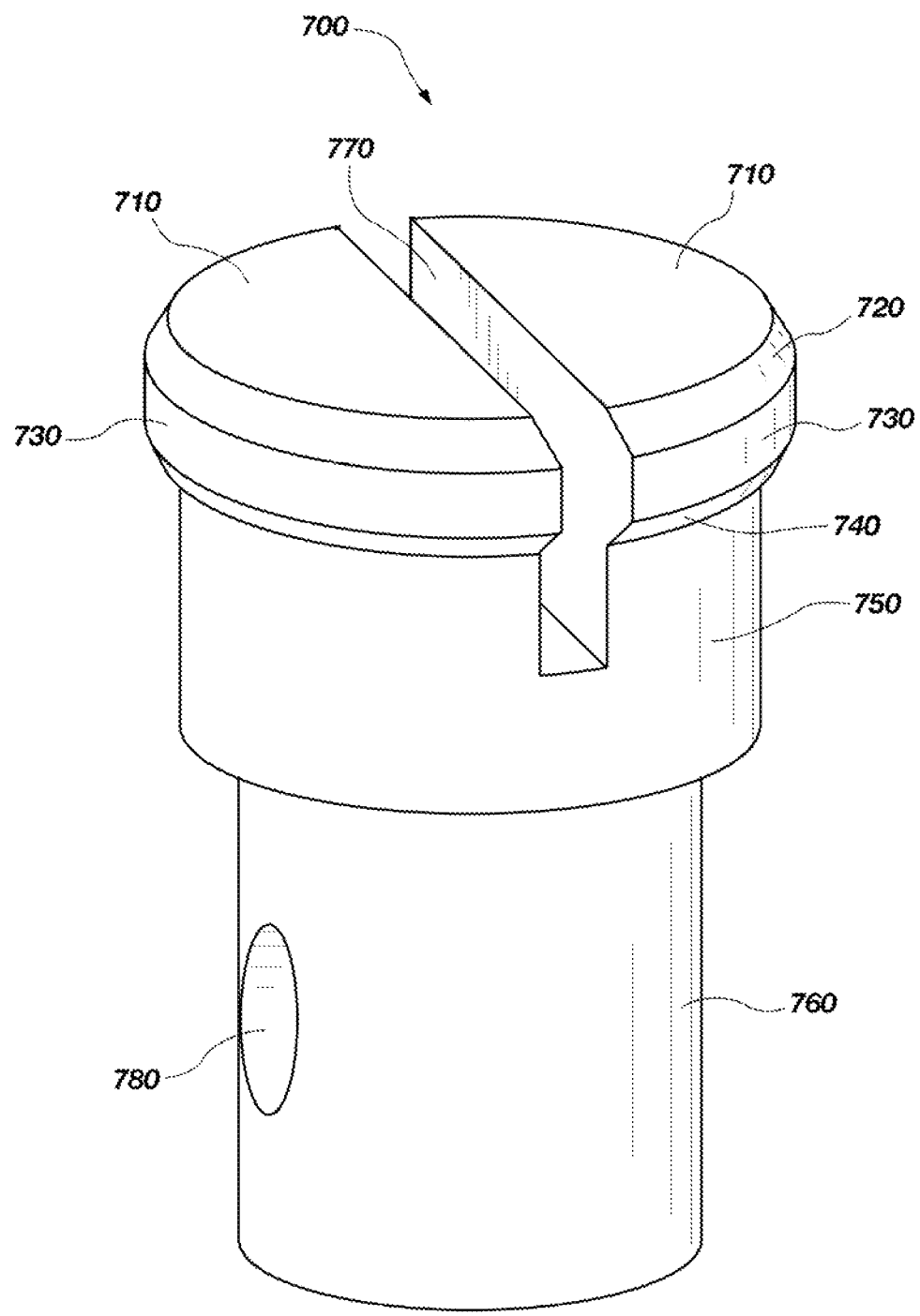
FIG. 7 is a perspective view of a transmitter compression fitting made in accordance with the teachings and principles of the disclosure.

FIG. 7 illustrates one illustrative embodiment of a compression fitting 700 for use with the transmitter housing 300 and chamber 200 (see FIG. 2) disclosed herein. The compression fitting 700 is preferably made from a strong, lightweight, semi-pliable, deformable or bendable material, such as plastic, metal, composite materials, etc. It will be appreciated that the compression fitting 700 is an engagement member. The compression fitting 700 comprises a tail portion 760 and head portion 750. The tail portion 760 can have a bore hole 780 for attaching the compression fitting 700 to the transmitter housing 300, as will be discussed in greater detail below. The head portion 750 further comprises a resected portion 770 and attachment surfaces, including: top surfaces 710, ramping surfaces 720 and 740 and side surfaces 730. As will be seen, these attachment surfaces can interact with corresponding surfaces within chamber 200 (see FIG. 2) to secure the transmitter within the chamber 200.

Figure 8:
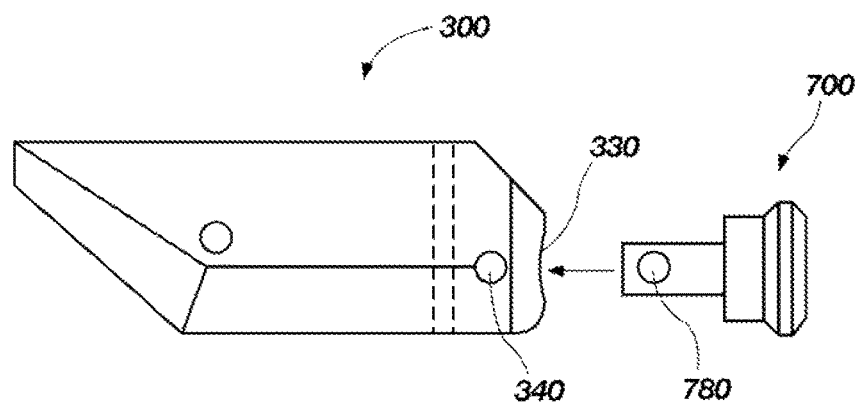
FIG. 8 is a side view of the transmitter of FIG. 4 and the compression fitting of FIG. 7 made in accordance with the teachings and principles of the disclosure.
Figure 9:
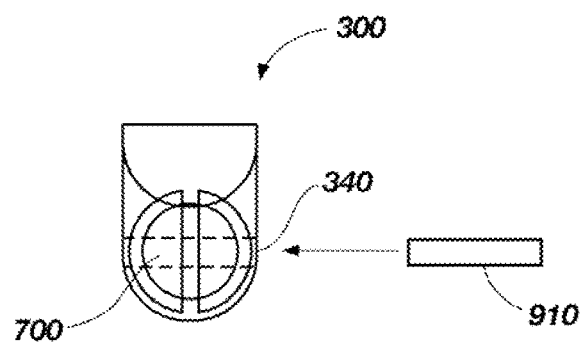
FIG. 9 is a front view of the transmitter of FIG. 4 and the compression fitting of FIG. 7 made in accordance with the teachings and principles of the disclosure.
Figure 10:
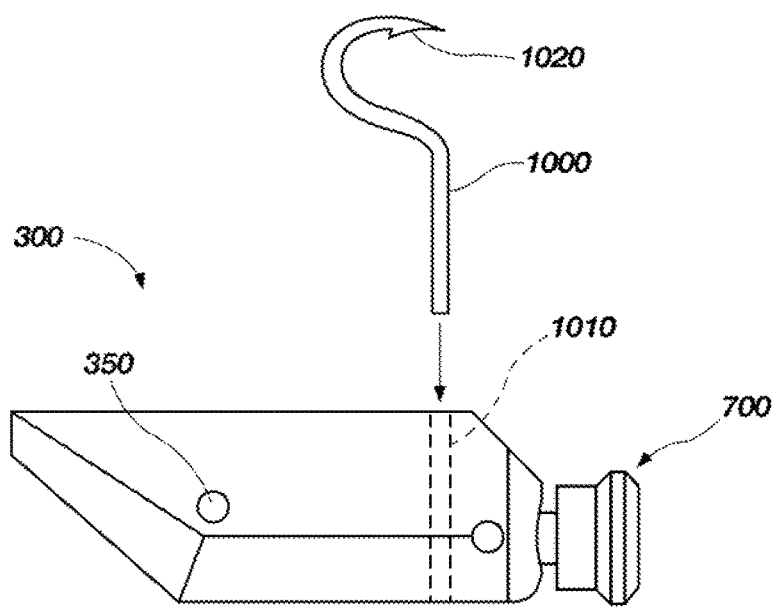
FIG. 10 is a side view of the transmitter of FIG. 9 with a hook made in accordance with the teachings and principles of the disclosure.

FIGS. 8-10 illustrate the assembly of the transmitter housing 300 of FIG. 3 with the compression fitting 700 of FIG. 7. Specifically, FIG. 8 shows the compression fitting 700 ready for insertion into the front bore hole 330 of the transmitter housing 300. Note that the side bore hole 340 of the transmitter housing 300 and the compression fitting bore hole 780 are aligned upon insertion.

FIG. 9 illustrates a front view of the transmitter housing 300 with compression fitting 700 inserted into the front bore hole 330 of transmitter housing 300. A pin 910 is then inserted into bore hole 340 and through the compression fitting bore hole 780 to secure the compression fitting 700 to transmitter housing 300. In an illustrative embodiment of the present disclosure, compression fitting 700 may be affixed to the transmitter housing 300 via threading or some other suitable method known by those skilled in the art.

FIG. 10 is a side view of the transmitter housing 300 and compression fitting 700 of FIG. 9. Additionally, one or more barbed hooks 1020 can be affixed to the transmitter housing 300 via insertion of the stem 1000 of the one or more barbed hooks 1020 into bore hole 1010 of transmitter housing 300. The number of hooks 1020 can be chosen depending on the strength of the hook and the amount of force the hook is expected to experience. The one or more barbed hooks 1020 can be secured within the bore hole 1010 of transmitter housing 300, with adhesive, by friction, via screw threading, via retaining pins, or by other means well-known to those skilled in the art. The one or more barbed hooks 1020 can also be molded or integrally formed within the transmitter body 300 during production. Additionally, the bore hole 350 can also be used to affix a wire, thread or other suitable material (not shown) to the transmitter body 300 to facilitate extraction of the transmitter housing 300 from the target animal.

Figure 11:
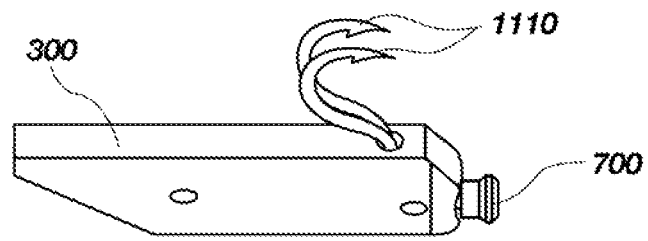
FIG. 11 is a side view of the transmitter of FIG. 10 made in accordance with the teachings and principles of the disclosure.
Figure 12:
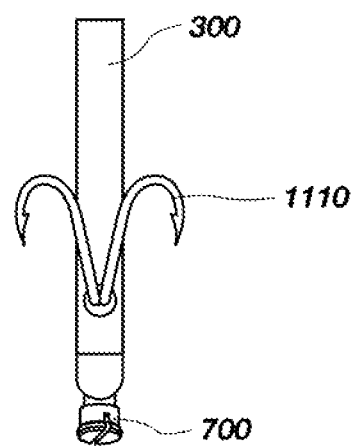
FIG. 12 is a top view of the transmitter of FIG. 11 made in accordance with the teachings and principles of the disclosure.
Figure 13:
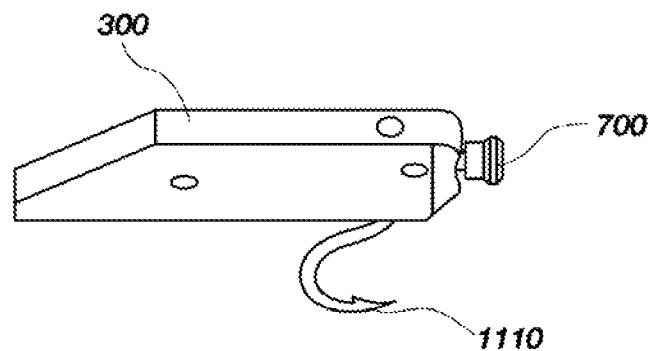
FIG. 13 is a bottom-side view of the transmitter of FIG. 11 made in accordance with the teachings and principles of the disclosure.

FIGS. 11-13 show various views of an illustrative embodiment of a completed transmitter housing assembly, including attached compression fitting 700 and dual barbed hooks 1110.

Figure 14:
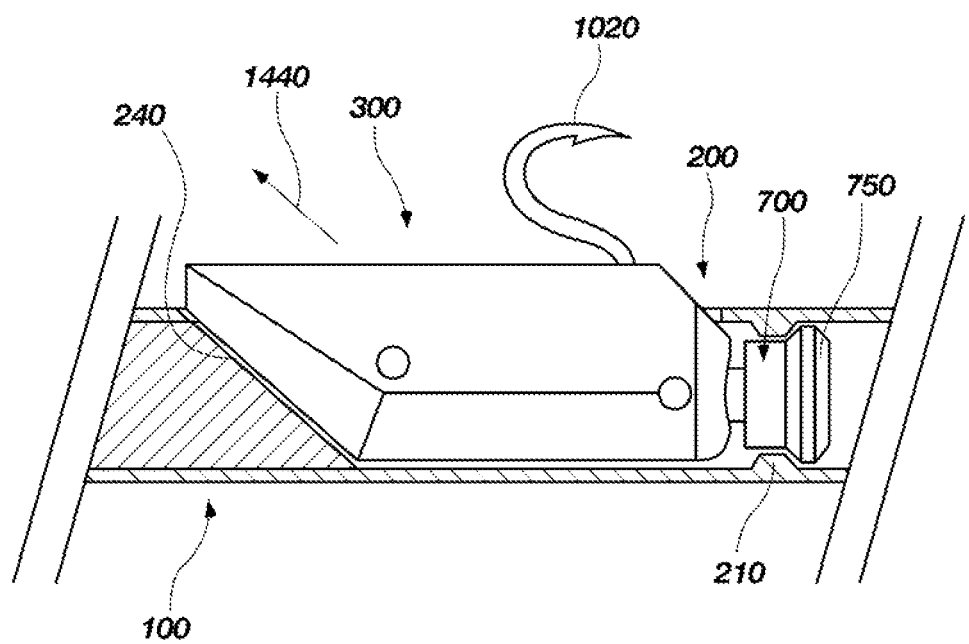
FIG. 14 is a partial sectional view of the arrow of FIG. 1A or 1B with the transmitter of FIG. 10 inserted within the arrow chamber.

FIG. 14 illustrates the completed transmitter housing 300 of FIG. 10 inserted into the chamber 200 as represented in FIG. 2. Arrow chamber 200 is provided with one or more retaining lips 210 to matingly engage the compression fitting 700 and secure the transmitter housing 300 in place. The operator accomplishes this by inserting the transmitter 300 into chamber 200 and pushing the transmitter compression fitting 700 forward against lips 210 with enough force to compress the two halves of the compression fitting 700 together (thereby reducing the diameter of the head 750 of the compression fitting 700) and allowing the head 750 of the compression fitting 700 to pass to the other side of lips 210. Once on the other side of the lips 210, the two halves of the head 750 of the compression fitting 700 are free to expand again, thereby securing the transmitter within the chamber 200. In an illustrative embodiment, the forces between the compression fitting 700 and lips 210 are sufficient enough to maintain the transmitter housing 300 affixed to the arrow 100 in view of the forces applied to the transmitter housing 300 when the arrow is shot, but not sufficient enough to withstand the impact of the transmitter housing 300 against the hide of the target animal. The lip 210 and compression fitting 700 size, design and lightweight material are all preferably chosen to reduce weight and retain arrow performance.

In operation, as the arrow 100 penetrates the target animal, an entry wound in the animal is produced by the broadhead 106. As the arrow 100 penetrates farther into the animal, the one or more barbed hooks 1020 (see FIG. 10) embeds in the animal hide or skin. Engagement of the barbed hook 1020 causes transmitter housing 300 to slow down and stop when the arrow 100 continues through the animal. With sufficient force, the compression fitting 700 will pop out of lips 210 (see FIG. 14) and the transmitter housing 300 will slide up the ramp surface 240, in the direction of arrow 1440, exiting chamber 200 and embedding itself on the outside of the hide of the target animal. In this manner, the transmitter in the transmitter housing 300 can then be used to track the wounded animal, which can travel for many miles before dying or resting. The hunter may utilize a handheld radio receiver to track the wounded animal. This allows the hunter to hunt more efficiently by focusing his/her time and energy on finding the wounded animal instead of searching for other target animals to hunt, possibly resulting in the loss of multiple wounded animals and wasting precious natural resources.

Figure 15:
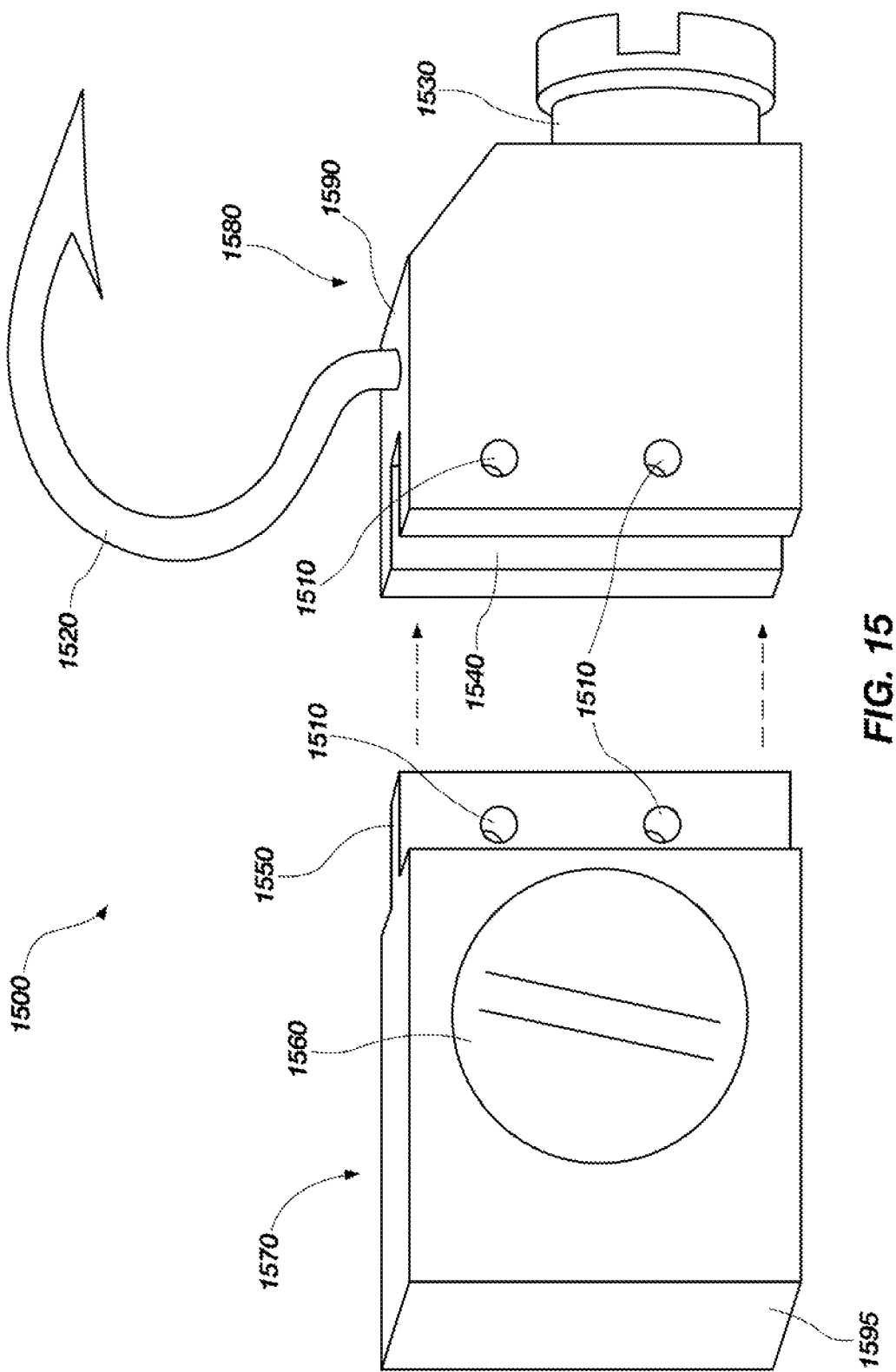
FIG. 15 is a perspective view of another embodiment of a transmitter made in accordance with the teachings and principles of the disclosure.

FIG. 15 illustrates an illustrative embodiment of a transmitter housing assembly 1500 in accordance with the present disclosure. Transmitter housing assembly 1500 includes two subassemblies: transmitter subassembly 1570 and attachment subassembly 1580. Transmitter subassembly 1570 can have an accessible battery housing 1560, projection 1550 and bore holes 1510, as well as an on/off switch (not explicitly shown) to conserve battery power. Attachment assembly 1580 can have a receiver portion 1540 to receive projection 1550 as well as bore holes 1510. Moreover, attachment assembly 1580 can also comprise at least one barbed hook 1520 and a compression fitting 1530. In one preferred embodiment, attachment assembly 1580 comprises two barbed hooks (one of which is shown at 1520) with the barbed ends of each hook protruding toward the distal end of attachment assembly 1580 (above compression fitting 1530) with each barbed hook also extending toward either side of attachment assembly 1580. In this embodiment, each bared and barbed hook is also preferably oriented and shaped so as to not substantially extend above the top surface 1590 of the attachment assembly 1580, if at all. That is to say, each barbed hook can also be oriented and shaped such that each barbed hook extends to either side of attachment assembly 1580 and below the top surface 1590 of the attachment assembly 1580. Orienting the barbed hooks in this manner (i.e., keeping the hooks low, and closer to the attachment assembly 1580), helps keep the mass of the barbed hooks closer to the axial center of mass of the arrow which helps maintain the accuracy of the arrow during flight. Transmitter subassembly 1570 and attachment subassembly 1580 can be affixed to each other by inserting projection 1550 into receiver portion 1540 and then inserting retaining pins (not explicitly shown) into bore holes 1510. This embodiment allows for removal of the more expensive transmitter subassembly 1570 from the less expensive (and more prone to breakage) attachment assembly 1580, thereby allowing reuse of transmitter assembly 1570.

In an illustrative embodiment of the present disclosure, the transmitter subassembly 1570 and attachment subassembly 1580 can be affixed to each other via any number of suitable means, including but not limited to: threading, reversible glue/adhesive, compression fitting, etc. Although not explicitly shown in FIG. 15, the proximal end of transmitter subassembly 1570 can assume a ramp shape, or any other shape described herein. Furthermore, in one preferred embodiment, the battery housing is configured to hold the batteries below the transmitter, given that batteries are typically heavier than the electronic components comprising the transmitter. This helps the center of mass of the transmitter assembly 1500 to line up with the axial center of mass of the arrow to maintain the accuracy of the arrow during flight.

Figure 16:
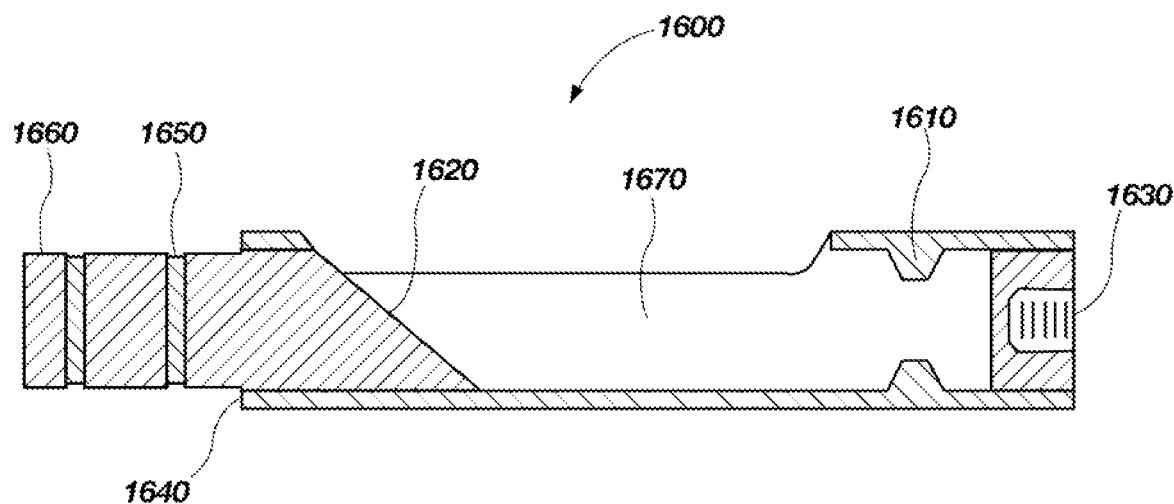
FIG. 16 is a sectional view of another embodiment of an arrow chamber extension made in accordance with the teachings and principles of the disclosure.

FIG. 16 illustrates an illustrative embodiment of the present invention wherein a chamber extension 1600 may advantageously be interposed as an extension between a broadhead and an arrow shaft (not shown in the figure). In such embodiment, a consumer need not purchase an entire arrow but rather only the chamber extension 1600 and transmitter, which may be installed onto an end of a conventional arrow. The proximal end of the chamber extension 1660 may be sized and notched 1650 so as to be inserted into the distal end of an arrow shaft, up to the larger diameter portion 1640 of the chamber extension 1600 and retained therein by frictional forces. Alternatively, the proximal end of the chamber extension 1660 may be threaded and attached to the distal end of the arrow shaft which is also threaded to receive the chamber extension 1600. In this embodiment the chamber extension 1600 may comprise an internally threaded female portion within the proximal end of the chamber extension 1660 that is configured to receive an externally threaded male portion projecting from the arrow. Alternatively, the chamber extension 1600 may comprise an externally threaded male portion protruding from the proximal end of the chamber extension 1660 which is configured to receive an internally threaded female portion within the arrow. A broadhead (not explicitly shown) can also be affixed to the chamber extension 1600 by means of a threaded aperture 1630 as shown in FIG. 16. Alternatively, the broadhead (not shown) can also be affixed to the chamber extension 1600 by means of an internally threaded female portion within the broadhead that is configured to receive an externally threaded male portion projecting from the distal end of the chamber extension 1600 (not explicitly shown).

Figure 17:
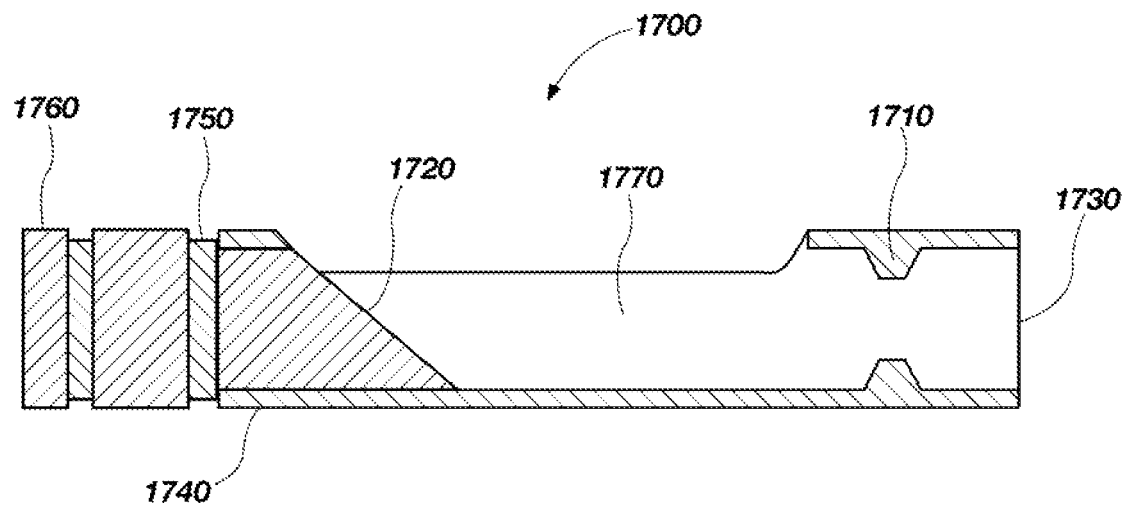
FIG. 17 is a sectional view of a further embodiment of an arrow chamber insert made in accordance with the teachings and principles of the disclosure.

FIG. 17 illustrates yet a further illustrative embodiment of the present invention wherein chamber insert 1700 may advantageously be inserted into the distal end of a hollow arrow shaft (not shown) having a chamber access window similar to that discussed previously. In such embodiment, a consumer need not purchase an entire arrow but rather only the chamber insert 1700 and transmitter. The proximal end of the chamber insert 1760 may be sized and notched 1750 so as to be inserted into the distal end of an arrow shaft and retained therein by frictional forces. Alternatively, the proximal end of the chamber extension 1760 may be threaded, glued, or otherwise affixed within the distal end of a hollow arrow shaft according to any number of ways known by those skilled in the art. In one embodiment the proximal end of the chamber extension 1760 may comprise an internally threaded female portion within proximal end of the chamber extension 1760 which is configured to receive an externally threaded male portion projecting from the arrow. Alternatively, the proximal end of the chamber extension 1760 may comprise an externally threaded male portion protruding from the proximal end of the chamber extension 1760 that is configured to receive an internally threaded female portion within the arrow.

Although certain illustrative embodiments involving detachable chamber portions have been described above in great detail, it is to be understood that entire arrows comprising integrally formed chambers therein can also be used without parting from the spirit or scope of the claimed invention.

Figure 18:
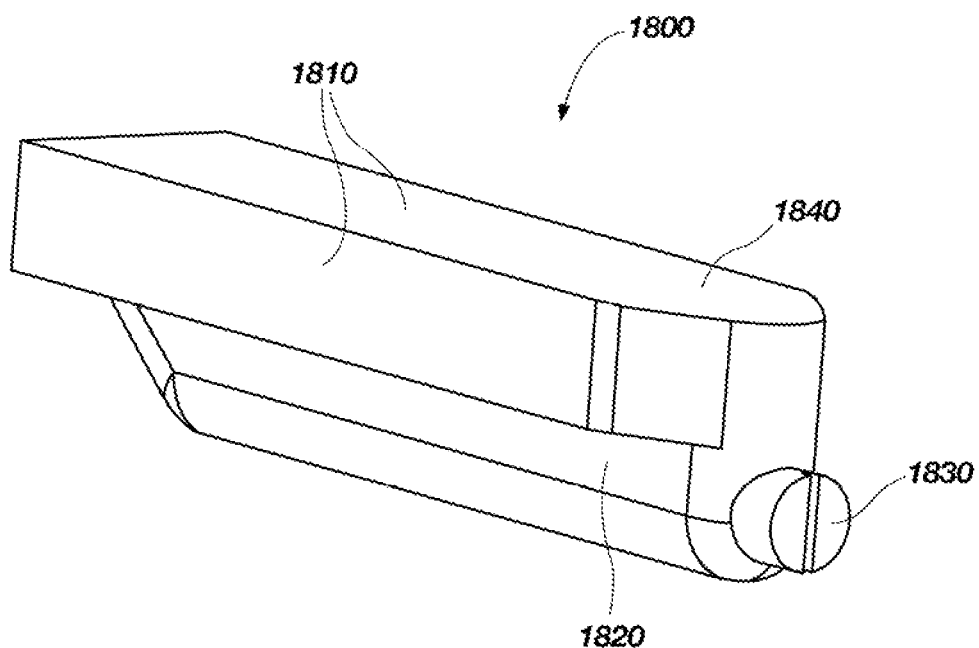
FIG. 18 is a front perspective view of a transmitter body made in accordance with the teachings and principles of the disclosure.
Figure 19:
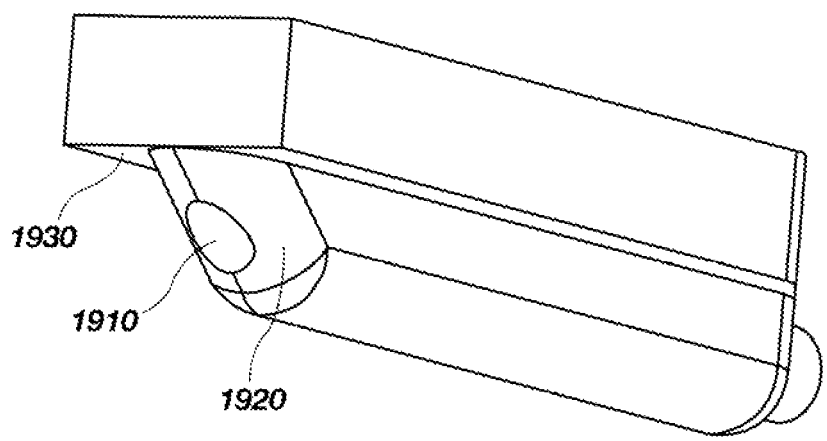
FIG. 19 is a rear perspective view of the transmitter body of FIG. 18.

FIGS. 18 and 19 illustrate different views of another illustrative embodiment of a transmitter housing or body 1800 in accordance with the present invention wherein the upper portion of the transmitter body 1810 is wider than the lower portion of the transmitter body 1820. The wider upper portion of transmitter body 1810 gives transmitter body 1800 more volume and internal space to include larger electronic components (e.g. transmitters, receivers, Global Positioning Satellite (GPS) receivers, batteries, etc.) to increase the power and/or usefulness of the transmitter. In one illustrative embodiment, the transmitter body 1800 comprises a GPS receiver and a transmitter (not explicitly shown) wherein the GPS receiver receives the GPS location of the transmitter body 1800 (typically within an animal carcass) and then the transmitter conveys the GPS location of the animal to a receiver used by the hunter (not explicitly shown) to locate the animal. Similar to previously described transmitter body embodiments, the transmitter body 1800 can also comprise at least one barbed hook (not explicitly shown) and a compression fitting 1830. In one preferred embodiment, the transmitter body 1800 comprises two barbed hooks (not explicitly shown) with the barbed ends of each hook protruding toward the distal end of the transmitter body 1800 (toward the compression fitting 1830) with portions of each barbed hook also extending toward either side of the transmitter body 1800.

In the illustrative embodiment of FIG. 18, each bared and barbed hook is also preferably oriented and shaped so as to not substantially extend above the top surface 1840 of the upper portion of the transmitter body 1810, if at all. That is to say, each barbed hook can also be oriented and shaped such that each barbed hook extends below the top surface 1840 of the upper portion of the transmitter body 1810. Orienting the barbed hooks in this manner (i.e., keeping the hooks low, and closer to the lower portion of the transmitter body 1820), helps keep the mass of the barbed hooks closer to the axial center of mass of the arrow which helps maintain the accuracy of the arrow during flight.

FIG. 19 is a perspective view of the proximal end of the transmitter body 1800 of FIG. 18 illustrating a recessed depression or dimple, or in some embodiments a protrusion, 1910 formed in the transmitter body ramp surface 1920. The depression 1910 can be preformed in the transmitter body ramp surface 1920 during the molding or forming process at the time of manufacture, or alternatively, the depression 1910 can also be formed after the molding process using any well known process for forming a depression known by those skilled in the art. The function of the dimple 1910 will be discussed in more detail below.

Figure 20:
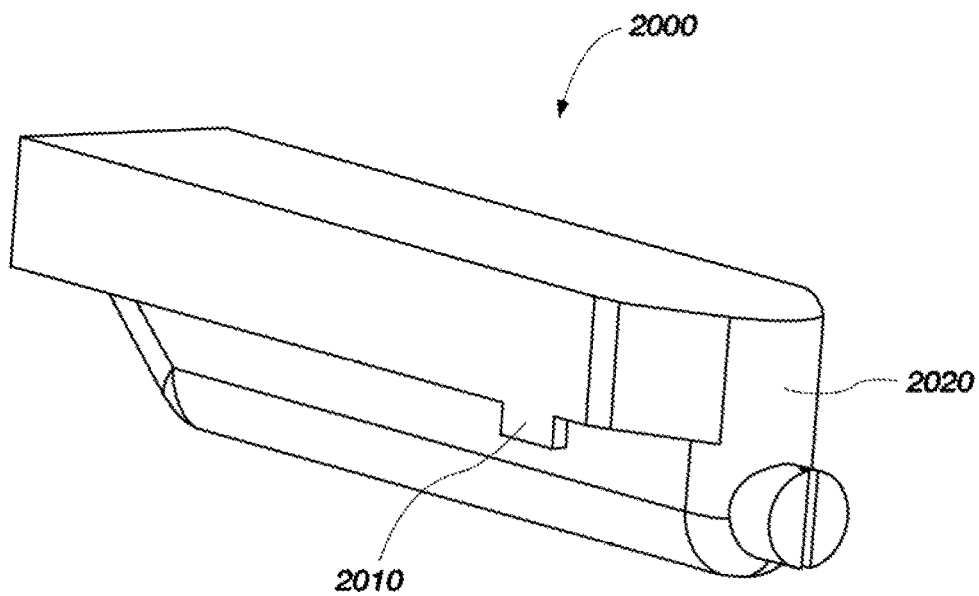
FIG. 20 is a front perspective view of a transmitter body made in accordance with the teachings and principles of the disclosure.
Figure 21:
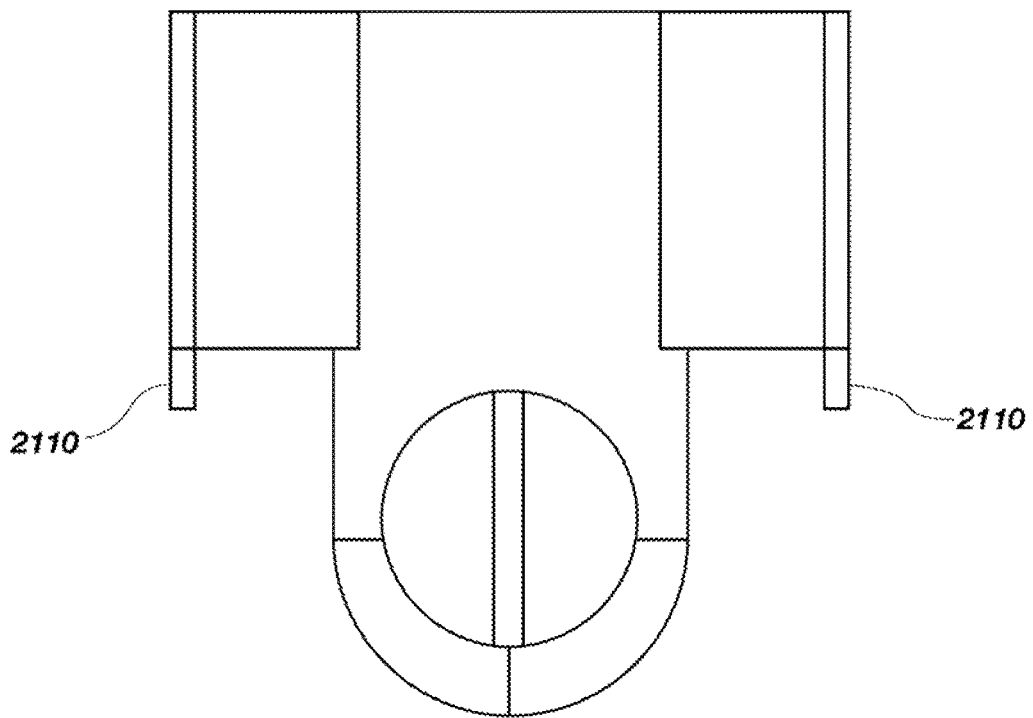
FIG. 21 is a front view of the transmitter body of FIG. 20.

FIGS. 20 and 21 show another illustrative embodiment of the present disclosure similar to that shown in FIGS. 18 and 19. Referring to FIG. 20, the upper portion 2020 of the transmitter body 2000 includes lateral stabilizers 2010 on each side of the upper portion 2020 of the transmitter body, toward the distal end of the transmitter body 2000 (the left stabilizer not being explicitly shown). FIG. 21 illustrates a front view of the transmitter body 2000 of FIG. 20 showing both the left and right lateral stabilizers 2110. The function of the lateral stabilizers 2110 will become more apparent from the disclosure relating to FIGS. 22-24, discussed below.

Figure 22:
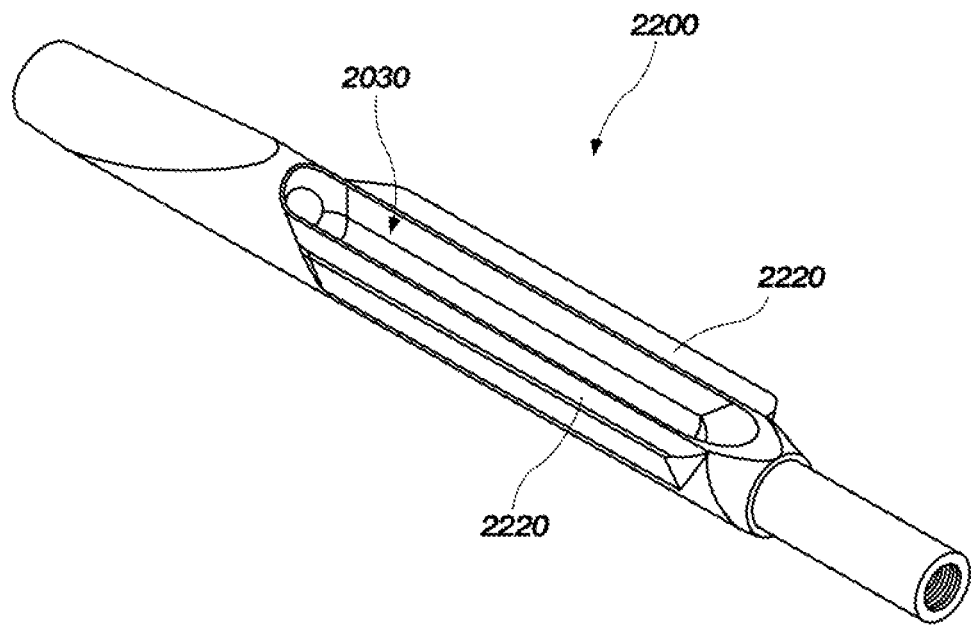
FIG. 22 is a front perspective view of a chamber insert made in accordance with the teachings and principles of the disclosure.
Figure 23:
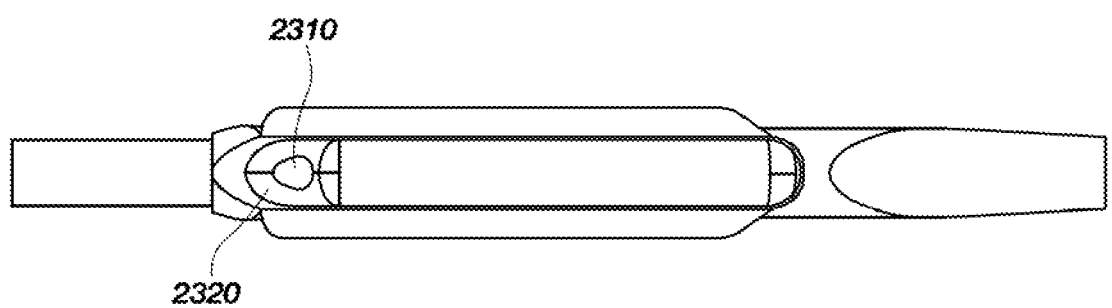
FIG. 23 is a top view of the chamber insert of FIG. 22.
Figure 24:
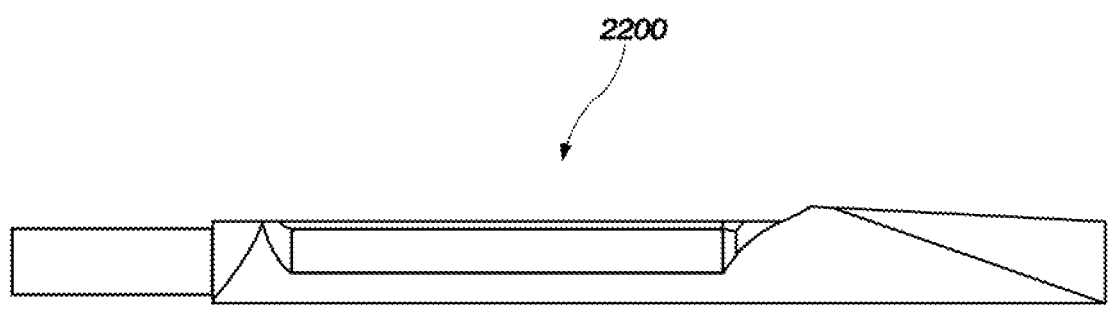
FIG. 24 is a side view of the chamber insert of FIG. 22.
Figure 25:
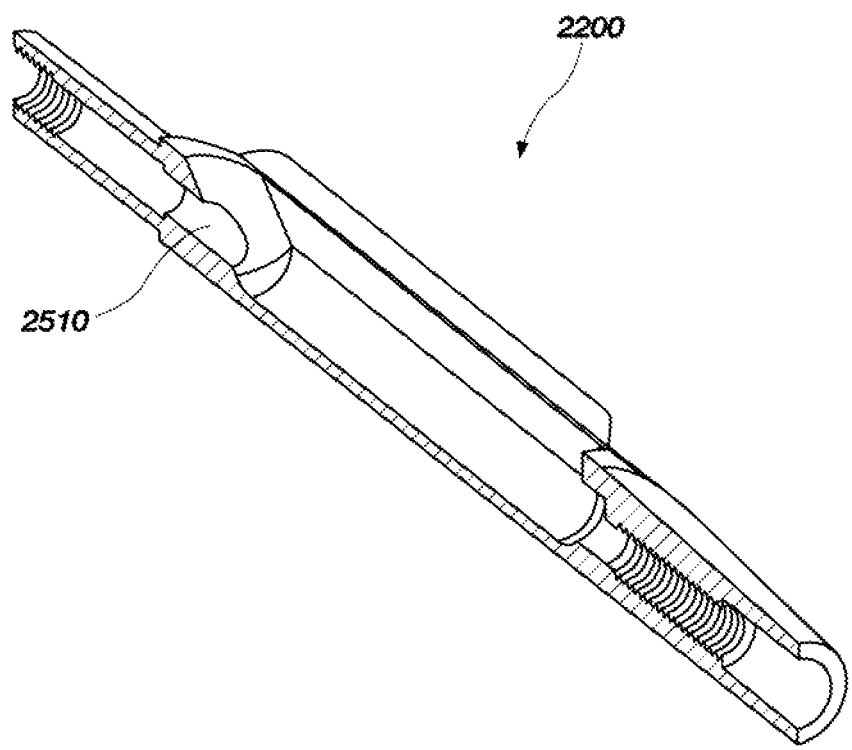
FIG. 25 is a front perspective cross-sectional view of the chamber insert of FIG. 22.
Figure 26:
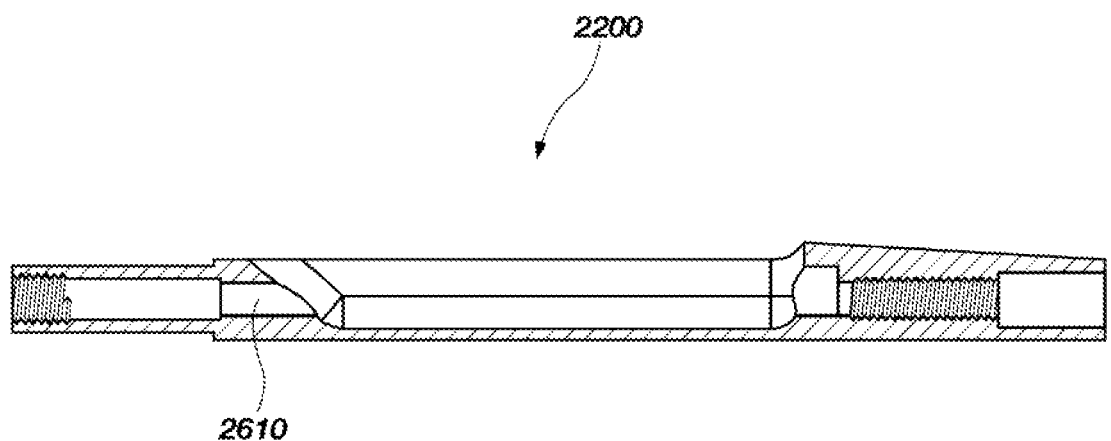
FIG. 26 is a cross-sectional side view of the chamber insert of FIG. 22.

The transmitter housing or bodies shown in FIGS. 18-21 may be used in conjunction with chamber inserts shown in FIGS. 22-30. FIG. 22 illustrates a front perspective view of one chamber insert embodiment 2200 having horizontal stabilizer members 2220 located on either side of the chamber opening 2030 and protruding laterally away from the chamber opening 2030. The horizontal stabilizer members 2220 are configured to receive and abut the lower surface of the upper portion of the transmitter body 1930 (see FIG. 19) to help stabilize the transmitter within the chamber during flight. FIG. 23 shows a top view of the chamber insert of FIG. 22, looking down into the chamber. The chamber ramp 2320 has a plunger bore hole 2310 configured to receive a suitable plunger (discussed below) to help stabilize the transmitter within the chamber during flight. FIG. 24 is a side view of the chamber insert of FIG. 22 and FIG. 25 is a perspective cross-sectional view of the chamber insert of FIG. 22 showing the inside of the plunger bore hole 2510 (see FIG. 25). FIG. 26 is a side cross-section view of the chamber insert of FIG. 22, also showing the inside of the plunger bore hole 2610.

Figure 27:
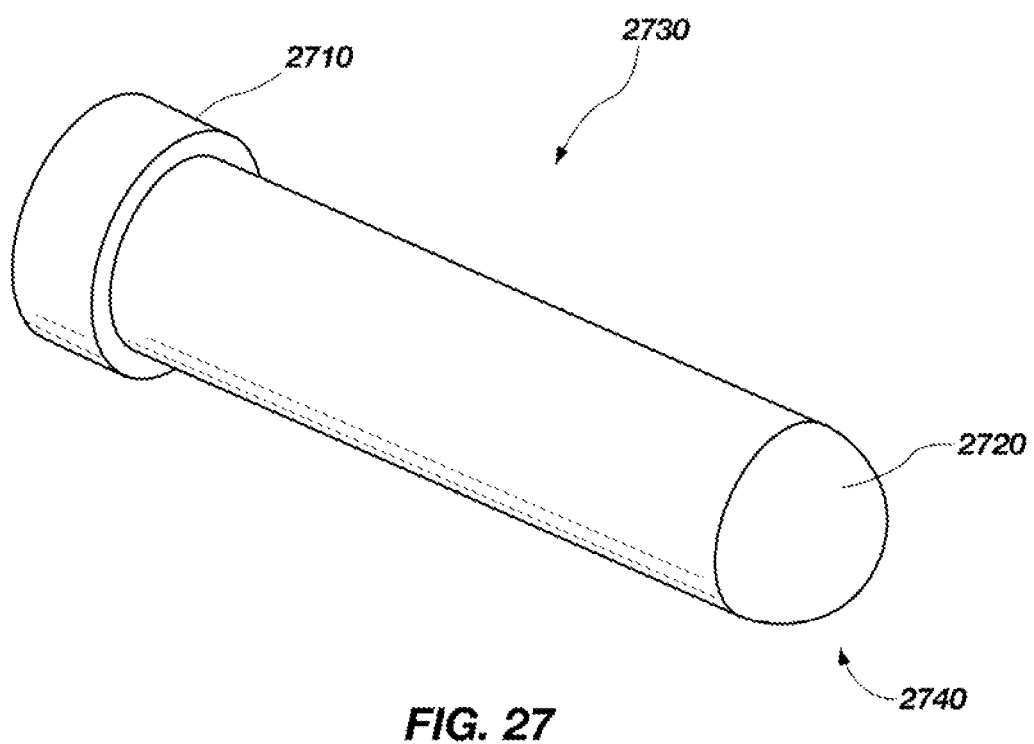
FIG. 27 is a front perspective view of a plunger made in accordance with the teachings and principles of the disclosure.
Figure 28:
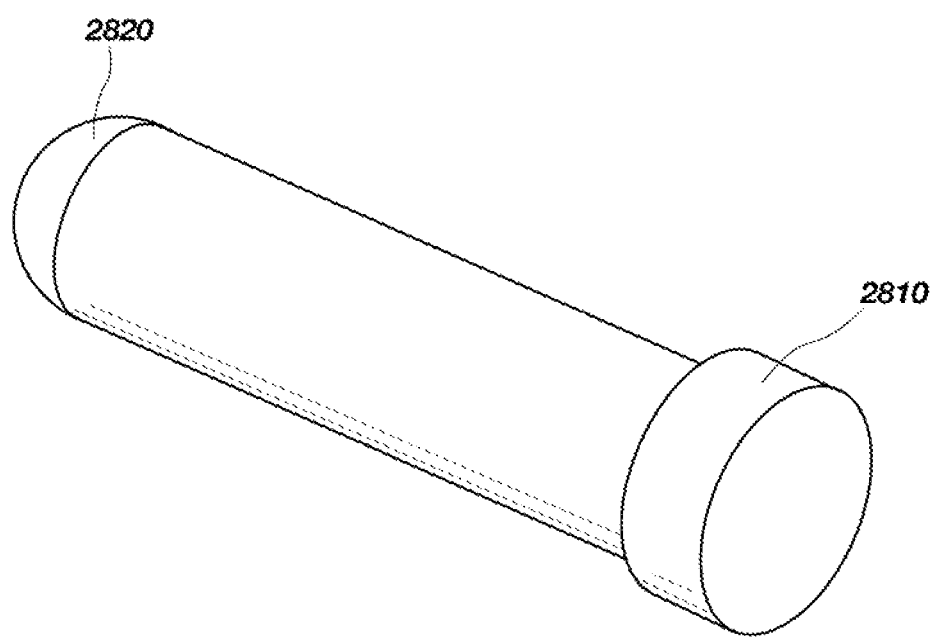
FIG. 28 is a rear perspective view of the plunger of FIG. 27.

FIGS. 27 and 28 are front and rear perspective views, respectively, of an exemplary plunger 2730 which can be inserted into the plunger bore hole of FIGS. 25 and 26 to help stabilize the transmitter within the chamber during flight. In will be appreciated that the plunger 2730 is an engagement member. The proximal end of the plunger 2730 can have a plunger retaining member 2710, 2810 (both references affixed to different views of the same structure) and the distal end of the plunger 2740 can have a plunger tip 2720, 2820 (both references affixed to different views of the same structure) that is preferably shaped and configured to engage the depression of a suitable transmitter (see FIG. 19) that is inserted into the chamber. In one illustrative embodiment, the plunger tip 2720, 2820 is rounded and smooth forming a substantially hemispherical shape configured to be received within a similarly shaped depression formed in the transmitter (see FIG. 19) to help retain the transmitter within the chamber.

Figure 29:
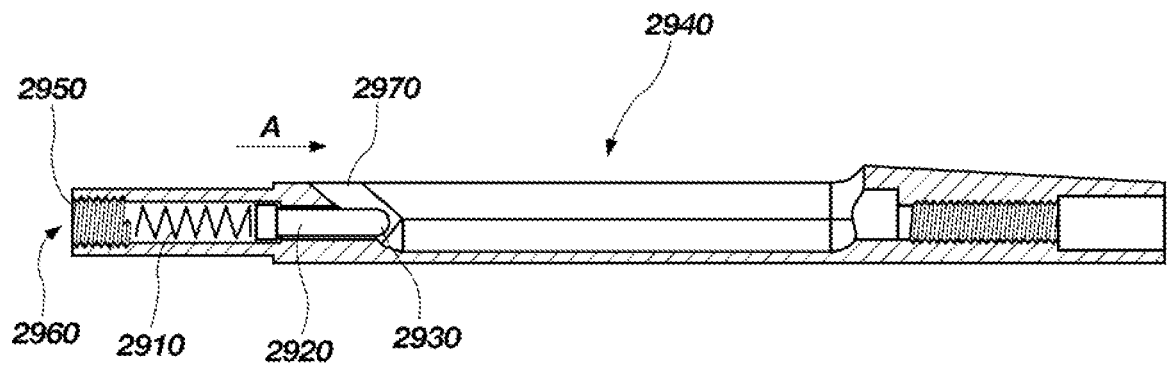
FIG. 29 is a cross-sectional side view of the chamber insert of FIG. 22 with a plunger inserted therein.

Referring now to FIG. 29, the plunger 2920 of FIGS. 27 and 28 is inserted into the plunger bore hole of the chamber insert of FIGS. 22-26. The plunger 2920 can be retained within the plunger bore hole by a resilient member 2910 and an adjustment member (not explicitly shown) located proximal to the resilient member 2910. In one embodiment, the resilient member 2910 is a spring which imparts a force on the plunger 2920, (in the direction of arrow A), causing the plunger tip 2930 to protrude into the chamber opening 2940. The force that the resilient member 2910 imparts on the plunger 2920 can be adjusted by choosing different springs with different spring constants K. Alternatively, or in addition thereto, the force that the resilient member 2910 imparts on the plunger 2920 can also be varied by an adjustment member (not explicitly shown). It will be appreciated that, for purposes of this disclosure, that the plunger 2920 is deformable by virtue of the resilient member 2910 and may form part of a snap-fit connection. Thus, it will be appreciated that the plunger 2920 is an engagement member.

Still referring to FIG. 29, for example, in one illustrative embodiment, the adjustment member has a threaded shaft configured to be received by the threaded portion 2950 of the proximal end of the chamber insert 2960. The adjustment member can also have an engagement surface (not explicitly shown) on the proximal end of the adjustment member that is configured to receive an adjustment tool (not explicitly shown) to allow a user to tighten or loosen the adjustment member and thereby increase or decrease the force that the resilient member 2910 imparts on the plunger 2920. In one illustrative embodiment, the engagement surface on the proximal end of the adjustment member is configured to receive a hex wrench adjustment tool. In other illustrative embodiments, the engagement surface on the proximal end of the adjustment member is configured to receive a screwdriver adjustment tool. In still other embodiments, the engagement surface on the proximal end of the adjustment member can be configured in any of a number of different shapes according to the particular shape of the adjustment tool being used, as is well known in the art.

In practice, a user can insert a transmitter, such as that shown in FIGS. 19-21, by inserting the proximal portion of the transmitter into the proximal end of chamber opening 2940, inserting the plunger tip 2930 into the depression 1910 of the transmitter (see FIG. 19), and then imparting enough force to push the plunger back into the plunger bore hole so as to allow for complete insertion of the transmitter into the chamber. Once the transmitter is completely inserted into the chamber, the resilient member imparts a continuous force on the plunger to thereby substantially secure the transmitter within the chamber. In this embodiment, the force on the plunger is preferably chosen (by adjusting the spring constant K and/or tension placed on the spring via the adjustment member, as described above) to be sufficient enough to retain the transmitter within the chamber given the forces applied to the transmitter when the arrow is shot and is traveling to the target, but not sufficient enough to withstand the impact of the transmitter against the hide of the target animal. The size, design and material of the adjustment member (not explicitly shown), resilient member 2910 and plunger 2920 are all preferably chosen to reduce weight so as to retain the arrow's performance during flight.

In operation, as the arrow penetrates the target animal, an entry wound in the animal is produced. As the arrow moves further into the animal, the one or more barbed hooks embeds in the animal hide or skin. Engagement of the one or more barbed hooks causes the travel of the transmitter assembly to slow down or stop as the arrow continues into the animal. With sufficient force, the transmitter will push the plunger 2930 back into the plunger bore hole and the transmitter will slide up ramp 2970, exit the chamber 2940, and embed itself in the hide of the target animal. In this manner, the transmitter can then be used to track the wounded animal, which can travel for many miles before dying or resting. This allows the hunter to hunt more efficiently by focusing his/her time and energy on finding the wounded animal instead of searching for other target animals to hunt, possibly resulting in the loss of multiple wounded animals and wasting precious wildlife resources.

Figure 30:
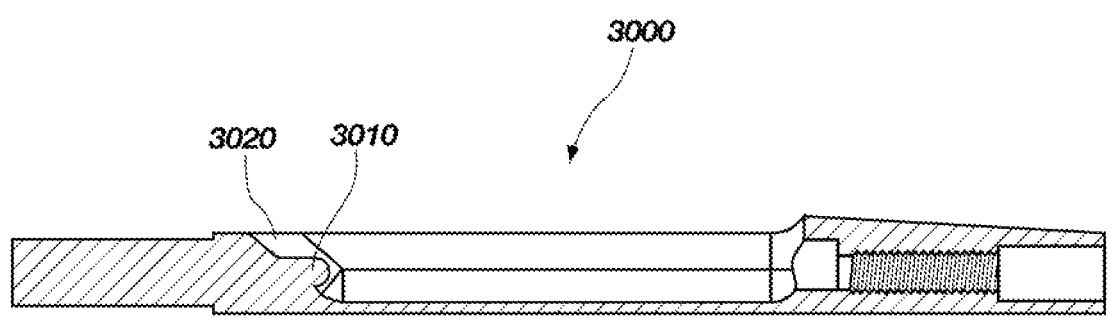
FIG. 30 is a cross-sectional side view of another chamber insert made in accordance with the teachings and principles of the disclosure.

FIG. 30 shows a cross-sectional side view of another chamber insert embodiment 3000, wherein the plunger tip 3010 is an integrally formed part of the ramping surface 3020. In this illustrative embodiment, the plunger tip 3010 is not adjustable, but rather it is sized and shaped to impart enough force to the transmitter to releasably secure the transmitter within the chamber. In this embodiment, the size and shape of the plunger tip 3010 is preferably chosen to be sufficient enough to retain the transmitter within the chamber given the forces that will be imparted to the transmitter when the arrow is shot, but not sufficient enough to withstand the impact of the transmitter against the hide of the target animal. For example, the size and shape of the plunger tip 3010 may be different depending on the strength of the bow that will be used. For instance a bow with a 90 pound draw weight may require the plunger tip 3010 to be sized and shaped so as to impart more force on the transmitter as compared to a bow with a 50 pound draw weight. Alternatively, or in addition thereto, the depression formed in the transmitter body ramp surface 1920 (see FIG. 19) can also be sized and shaped differently to impart enough force to the transmitter to substantially secure the transmitter within the chamber depending on the foreseeable forces that the transmitter is expected to experience.

Although the above transmitter bodies and chamber inserts have been described with the transmitter body having the depression and the chamber body having the protrusion, (i.e., the plunger tip), it is to be understood that in other embodiments the transmitter body can incorporate a protrusion and/or plunger system and the chamber insert can have a matching depression formed in the ramping surface without departing from the spirit or scope of the present disclosure.

Figure 31:
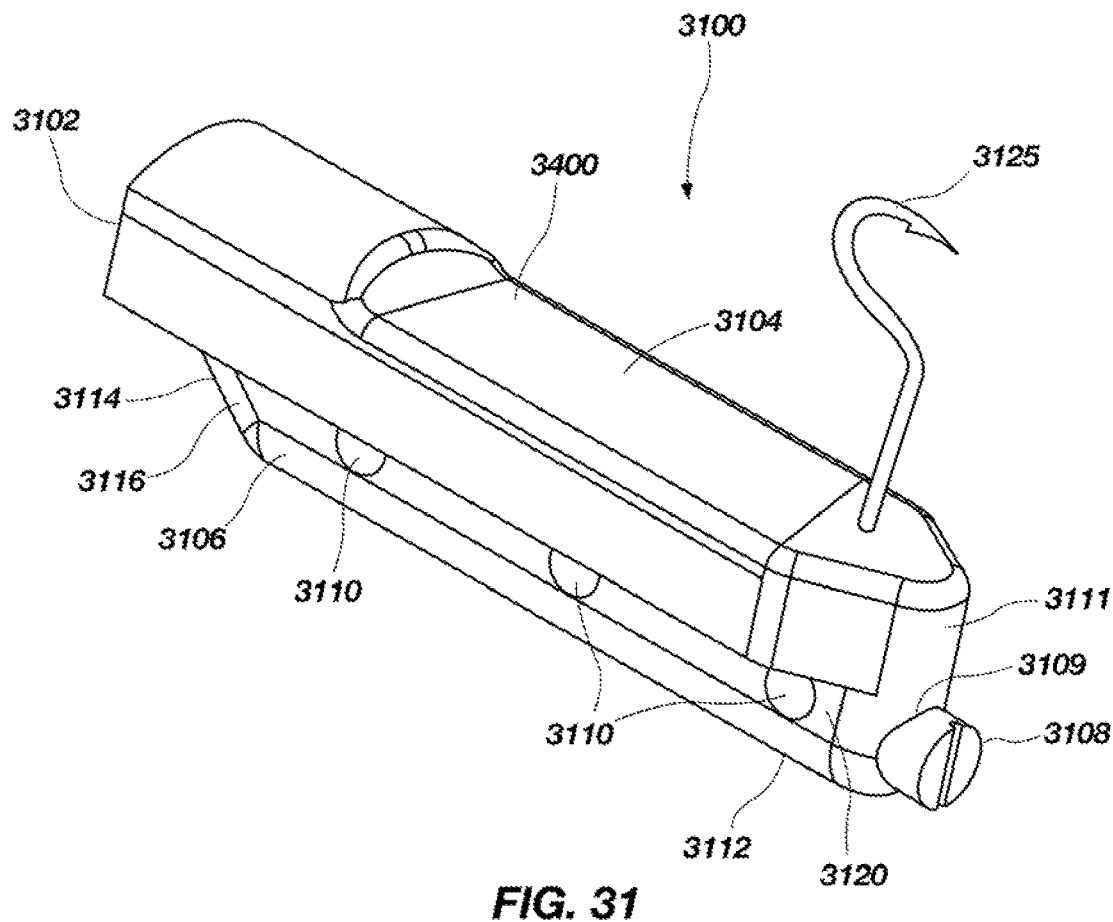
FIG. 31 is a front perspective view of a transmitter body made in accordance with the teachings and principles of the disclosure.
Figure 32:
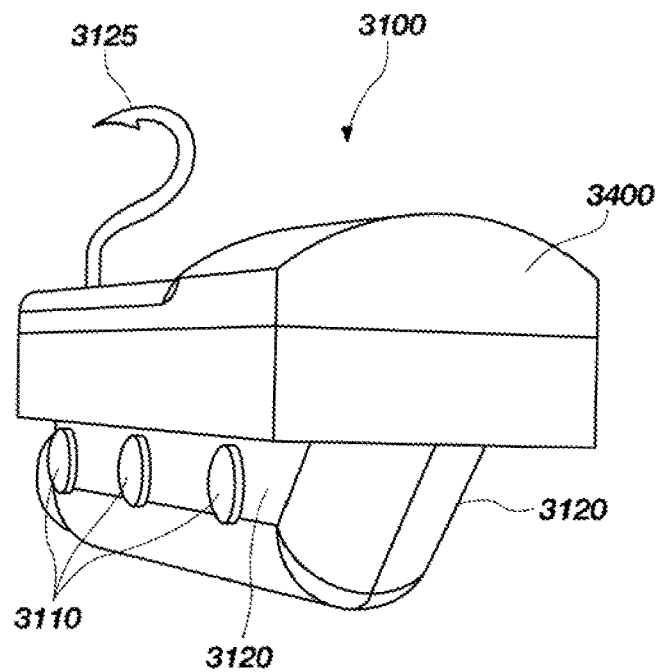
FIG. 32 is a rear perspective view of the transmitter body of FIG. 31.
Figure 33:
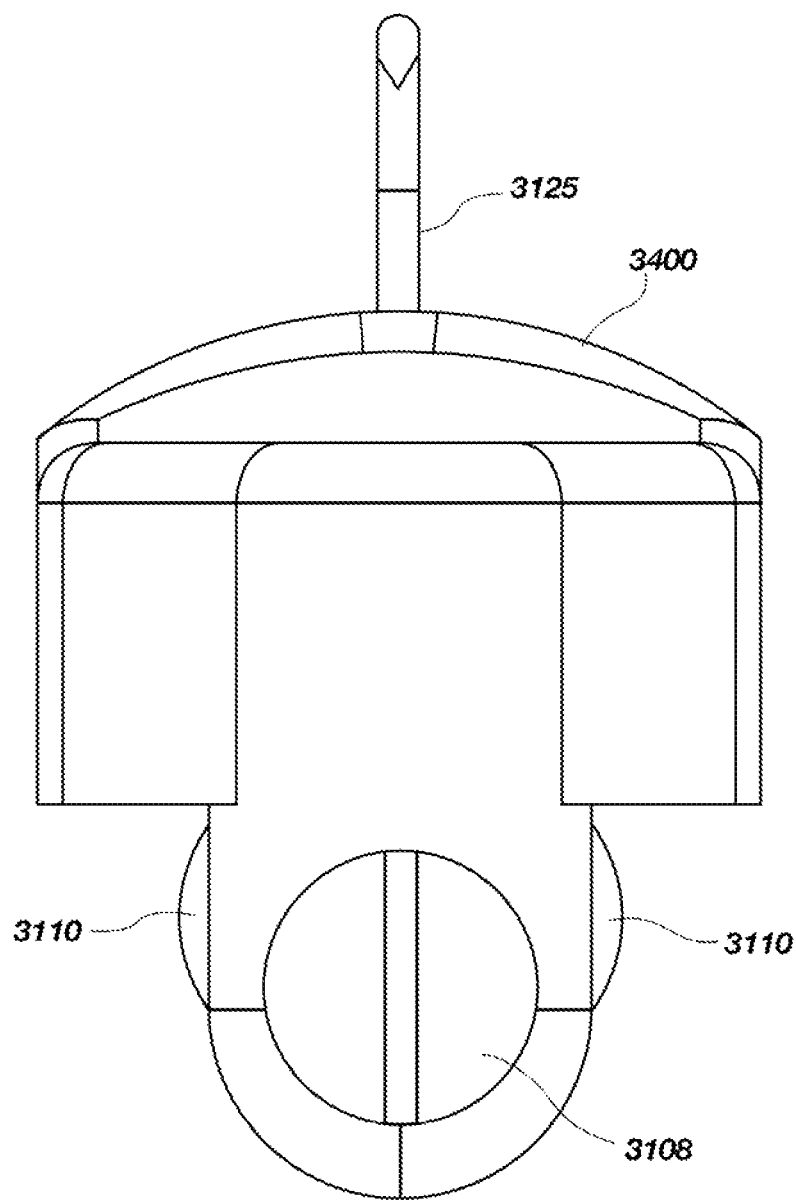
FIG. 33 is a front view of the transmitter body of FIG. 31.

Referring now to FIGS. 31-33, an illustrative embodiment of a transmitter housing 3100 is disclosed. In an embodiment of the present disclosure, the transmitter housing 3100 is adapted to contain a radio transmitter (not explicitly shown in the figures) within the housing 3100. The radio transmitter may be utilized to transmit radio frequency signals that may be utilized to determine the location of the transmitter housing 3100. In an embodiment of the present disclosure, the transmitter housing 3100 may include a battery for powering the radio transmitter in the housing 3100. In an illustrative embodiment of the present disclosure, the transmitter housing 3100 may further comprise a GPS receiver that may be utilized to receive location information that may be transmitted by a transmitter in the housing 3100 to a user.

Still referring to FIGS. 31-33, the transmitter housing 3100 may include a body 3102 having a upper portion 3104 and a lower portion 3106. A compression fitting 3108 may be installed into a bore 3109 in a distal end 3111 of the body 3102. It will be appreciated that the compression fitting 3108 is an engagement member. The lower portion 3106 may be adapted to be received within a chamber of an arrow shaft. The lower portion 3106 may include a bottom 3112 and a ramp 3114 on a proximal end 3116. The lower portion 3106 may include side portions 3120 extending from the distal end 3111 to the proximal end 3116. Extending from the side portions 3120 may be one or more protruding retaining members 3110. It will be appreciated that the retaining member 3110 are an engagement member. In an embodiment, the retaining members 3110 may have a substantially semi-spherical shape. In an illustrative embodiment, the retaining members 3110 may assume a multitude of different shapes depending on the desired retaining strength needed for a given transmitter housing 3100. The structure and function of the one or more retaining members 3110 will be discussed in greater detail below in conjunction with certain chamber insert embodiments. The transmitter housing 3100 may include one or more animal engagement members 3125 for engaging a hide of a target animal. In an illustrative embodiment of the present disclosure, the animal engagement members 3125 may comprise barbed hooks. The upper portion 3104 of the body 3102 may be too large to fit within a chamber of an arrow.

Figure 34:
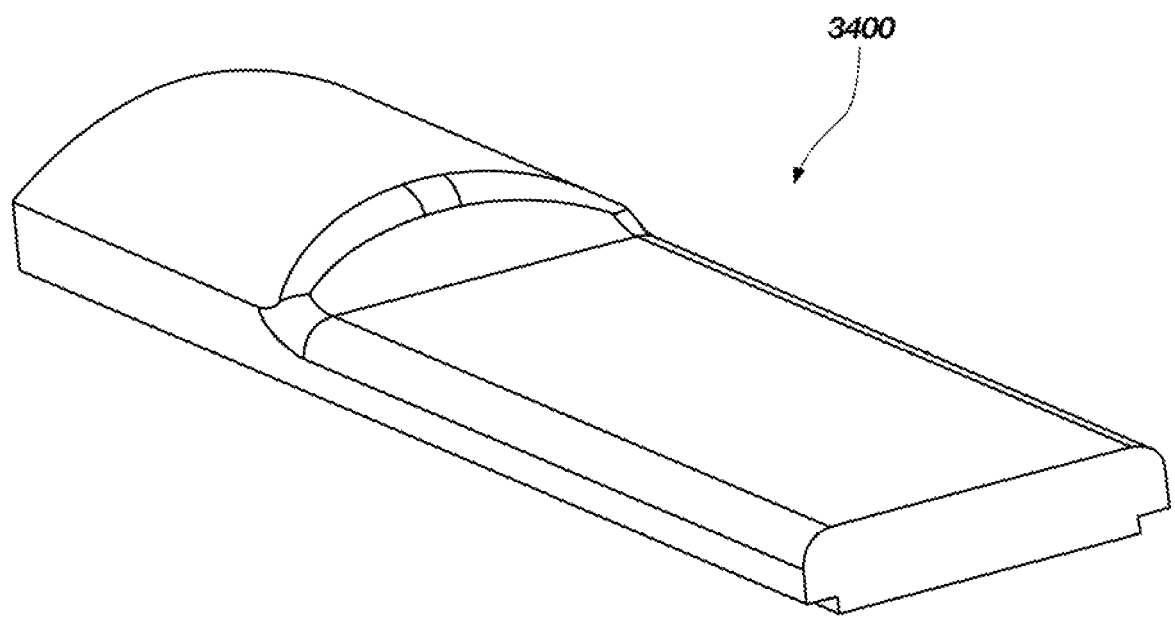
FIG. 34 is a front perspective view of a transmitter lid made in accordance with the teachings and principles of the disclosure.
Figure 35:
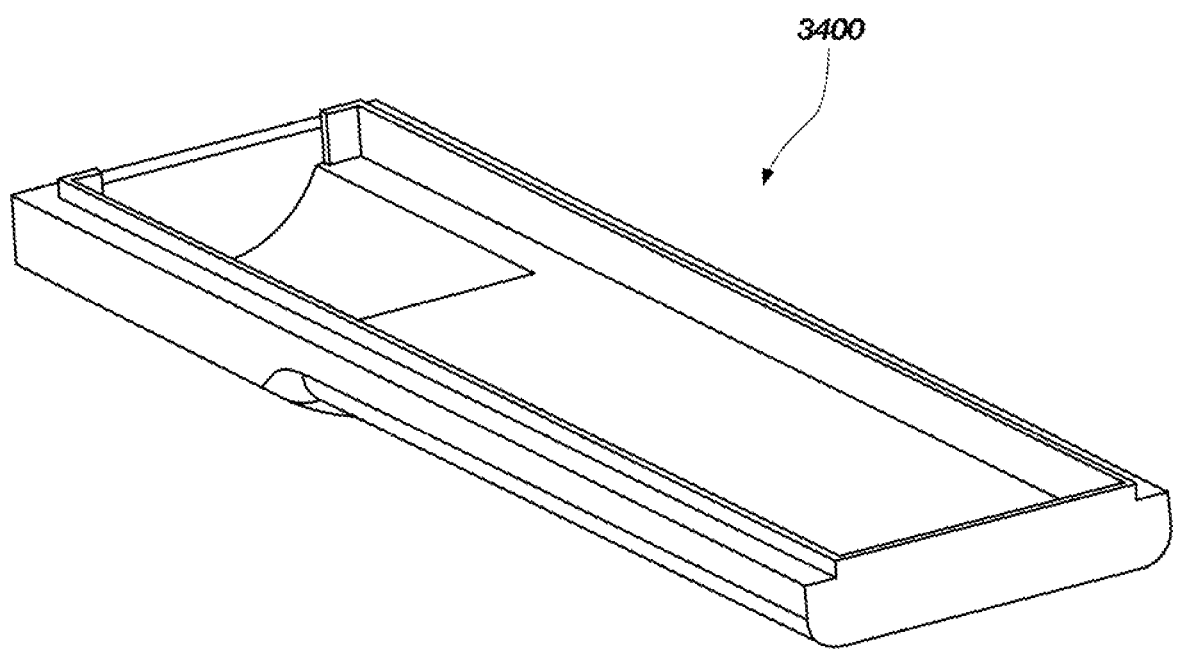
FIG. 35 is a rear perspective view of the transmitter lid of FIG. 34.

The transmitter housing 3100 may have a removable cover 3400 (FIGS. 34 and 35) to allow a user to gain access to the battery or batteries and/or electronic components housed within the transmitter housing 3100. For example, FIGS. 34 and 35 show top and bottom perspective views of an embodiment of a removable transmitter cover 3400 that can be used in conjunction with the transmitter shown in FIGS. 31-33.

Figure 36:
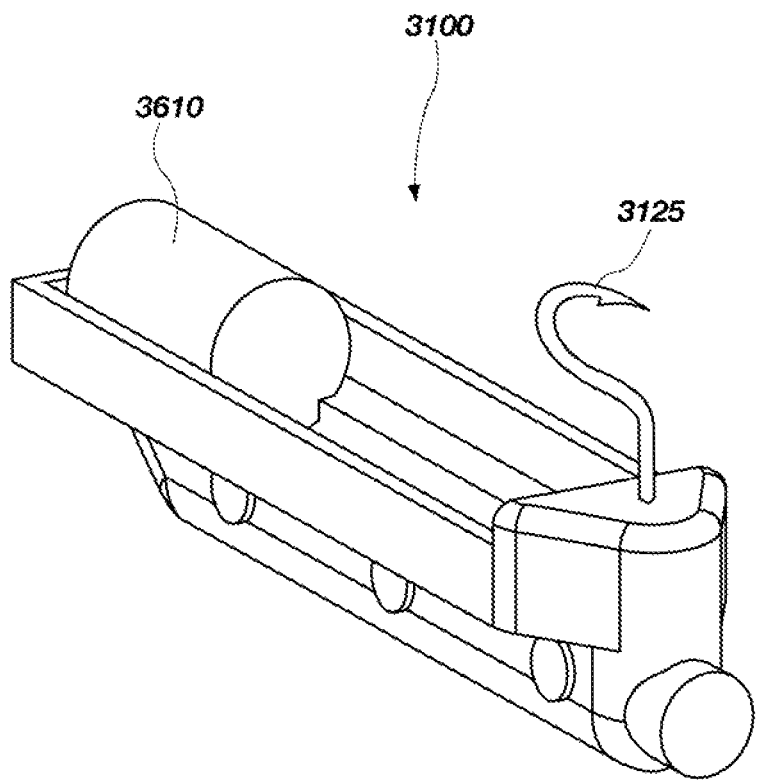
FIG. 36 is a front perspective view of a transmitter body with the lid removed made in accordance with the teachings and principles of the disclosure.

FIG. 36 depicts the transmitter housing 3100 of FIGS. 31-33 with the transmitter lid removed exposing the internal portion of the transmitter housing 3100 and revealing internal member 3610. Internal member 3610 can comprise one or more components, including, but not limited to, one or more Global Position System (GPS) receivers, one or more batteries, one or more analog transmitters, one or digital transmitters, electronic circuitry, one or more antennas, etc. However, it is to be understood that any transmitter body disclosed herein can house one or more components, including but not limited to, one or more Global Position System receivers, one or more batteries, one or more analog transmitters, one or more digital transmitters, pertinent electronic circuitry, one or more antennas, etc. There can be many internal components housed within internal member 3610 and/or there can also be other internal components (not explicitly shown) housed within the transmitter 3100.

Figure 37:
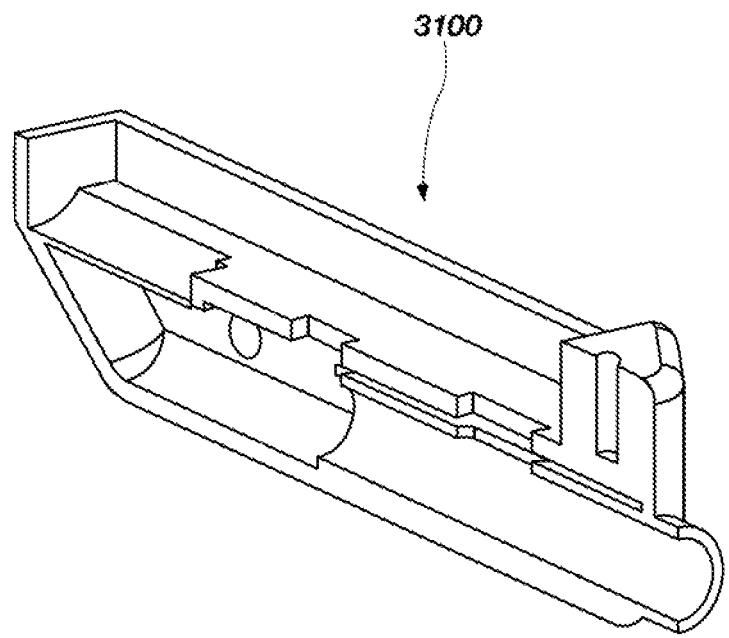
FIG. 37 is a front perspective cross-sectional view of the transmitter body of FIG. 36.

FIG. 37 is a perspective cross-sectional side view of the transmitter housing 3100 of FIG. 36 showing how the internal space within the transmitter housing 3100 can be arranged into different compartments of various sizes and shapes. The particular size and shapes of the internal compartments within the transmitter body 3100 can vary depending on the size and shapes of the internal components to be housed therein. As mentioned previously, it is desirable to arrange the heaviest internal components (e.g., batteries) such that they are aligned with the axial center of mass of the arrow to maintain desirable flight characteristics. However, it is also to be understood that this arrangement is not required by the present disclosure such that in some embodiments the heavier components may not be optimally aligned with the center of mass of the arrow.

Figure 38:
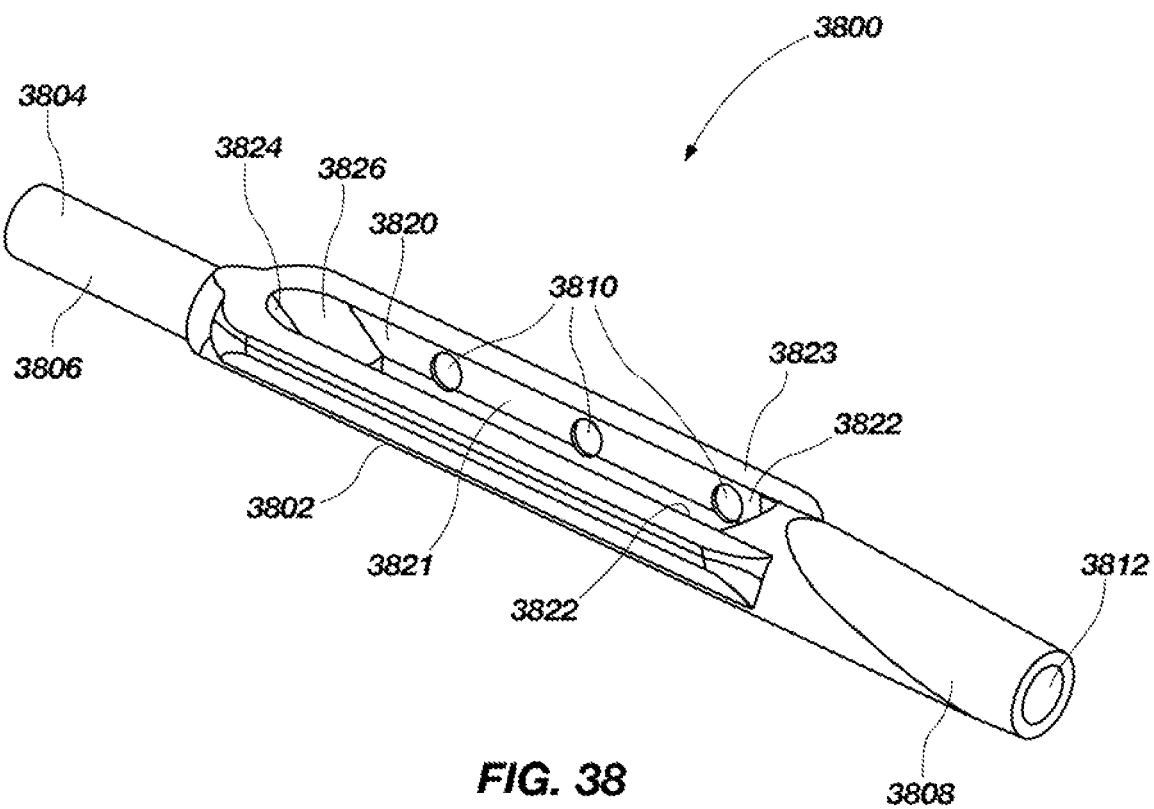
FIG. 38 is a front perspective view of a chamber insert made in accordance with the teachings and principles of the disclosure.
Figure 39:
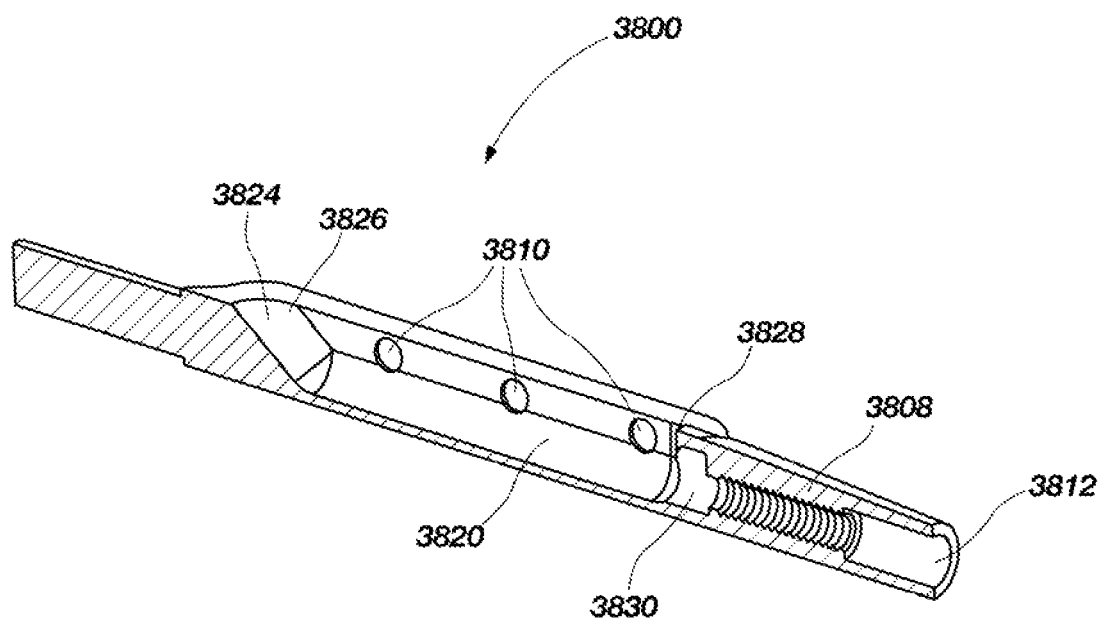
FIG. 39 is front perspective cross-sectional view of the chamber insert of FIG. 38.

FIGS. 38 and 39 illustrate an illustrative embodiment of an insert or an arrow shaft extension 3800 that may be used in conjunction with the transmitter housing 3100 of FIGS. 31-37. The insert 3800 may include a shaft portion 3804 on its proximal end 3806. The shaft portion 3804 may be received into a distal end of a hollow shaft of a hunting arrow (not shown). The shaft portion 3804 may be secured by adhesive or threads. It will be appreciated that the insert 3800 may form part of, or an extension of, the arrow shaft. A distal end 3808 of the insert 3800 may include a female threaded bore 3812 for receiving a male threaded end of an arrow tip, such as a broadhead. The insert 3800 may include a chamber 3820 for receiving the transmitter housing 3100. A window 3821 may provide access to the chamber 3820. A planar deck 3823 may surround some or all of the window 3821.

The chamber 3820 may include a pair of opposing sidewalls 3822. The sidewalls 3822 may have one or more retaining dimples, recesses or depressions 3810 that are configured to line up with and receive the retaining members 3110 (see FIGS. 31-33 showing the protrusions) along the side surfaces 3120 of the transmitter housing 3100. It will be appreciated that the retaining dimples 3810 function as one example of an engagement member. In an illustrative embodiment of the present disclosure, the retaining dimples 3810 form depressions in the internal sides 3822 of the chamber 3820 and have a substantially partially spherical shape that corresponds to the substantially partially spherical shaped retaining members 3110 of the transmitter housing 3100 in FIGS. 31-33.

Still referring to FIGS. 38 and 39, a proximal end 3824 of the chamber 3820 may include a ramp 3826 having a functionality as previously described. As best seen in FIG. 39, a distal end 3828 of the chamber 3820 may include a lip 3830 for receiving the compression fitting 3108 (see FIG. 31) on the transmitter housing 3100. The lip 3830 is an engaging surface and may be deformable. It will be appreciated that the chamber 3820 is sized and dimensioned to receive the lower portion 3106 of the transmitter housing 3100.

Referring to FIGS. 31-33, 38 and 39, in operation a user inserts the lower portion 3106 of the transmitter housing 3100 into the chamber 3820 with sufficient force to "snap" the transmitter body 3102 securely in the chamber 3820 by forcing the retaining members 3110 inside of the retaining dimples 3810. The insert 3800 and/or the transmitter housing 3100 may be made from a semi-rigid, deformable or flexible material (e.g., plastic) to facilitate the insertion of the transmitter housing 3100 into the chamber 3820 by a "snap-fit." Once the lower portion 3106 of the transmitter housing 3100 is completely inserted into the chamber 3820, the flexible chamber insert 3800 (and/or transmitter housing 3100) returns to its normal position and substantially retains the transmitter housing 3100 within the chamber 3820. In an embodiment of the present disclosure, the size, shape and number of retaining members 3110 (and corresponding retaining dimples 3810), as well as the flexibility and surface characteristics of the materials comprising the chamber 3820 insert and/or the transmitter housing 3100 can be chosen to achieve a desired retaining strength for a particular transmitter. That is to say, all of these factors can be chosen such that the force necessary to remove the transmitter housing 3100 from the chamber 3820 is sufficient enough to retain the transmitter in view of the forces that will be applied to the transmitter when the arrow is shot, but not sufficient enough to withstand the impact of the transmitter against the hide of the target animal. For example, an illustrative embodiment of a chamber/transmitter body system can have two sets of retaining members and corresponding retaining dimples (one on each side of the chamber/transmitter body system) which may be suitable for a hunter using a bow with a 40 pound draw weight. Another illustrative embodiment of a chamber/transmitter body system can have three sets of retaining members and corresponding retaining dimples (one on each side of the chamber/transmitter body system) which may be suitable for a hunter using a seventy pound bow. Yet another illustrative embodiment of a chamber/transmitter body system can have five sets of retaining members and corresponding retaining dimples (one on each side of the chamber/transmitter body system) which may be suitable for a hunter using a bow with a 90 pound draw weight.

In practice, as an arrow penetrates the target animal, an entry wound in the animal is produced. As the arrow moves further into the animal, the one or more barbed hooks (not explicitly shown in all of the figures) embeds in the animal hide or skin. Engagement of the one or more barbed hooks causes the transmitter housing to slow down or stop as the arrow continues through the animal. It will be appreciated that structures which perform similarly as barbed hooks can also be used in accordance with the present disclosure. With sufficient force, the chamber and/or transmitter material will flex enough to "pop" the retaining members out of the retaining dimples, allowing the transmitter body to slide up the chamber ramp, exit the chamber and embed itself in the hide of the target animal. The transmitter itself may remain on the outside of the animal. In this manner, the transmitter can then be used to track the wounded animal, which can travel for many miles before dying or resting. This allows the hunter to hunt more efficiently by focusing his/her time and energy on finding the wounded animal instead of searching for other target animals to hunt, possibly resulting in the loss of multiple wounded animals and wasting precious wildlife resources.

It is to be understood, that any number of retaining members and corresponding retaining dimples (in sets or otherwise) can be used without departing from the spirit or scope of the present disclosure. It is also to be understood that the retaining members and retaining dimples of this embodiment can also be used with other features disclosed herein. For example, in one embodiment the chamber/transmitter body system can comprise retaining members and retaining dimples as well as the plunger system and the compression fitting systems disclosed herein. Furthermore, although certain illustrative embodiments involving detachable chamber portions and chamber inserts have been described above in great detail, it is to be understood that entire arrows comprising integrally formed chambers therein can also be used without departing from the spirit or scope of this invention.

In yet a further embodiment of the present disclosure, a transmitter (not shown in all of the figures) can be secured to an arrow shaft by an tearable strip, such as an adhesive strip, having sufficient bonding or shear strength to maintain the transmitter affixed to the arrow in view of the forces applied to the transmitter when the arrow is shot, but not sufficient enough to withstand the impact of the transmitter against the hide of the target animal. In one embodiment the strip used to secure the transmitter comprises polyolefin adhesive tape having the desirable bonding and shear strength.

Figure 40:
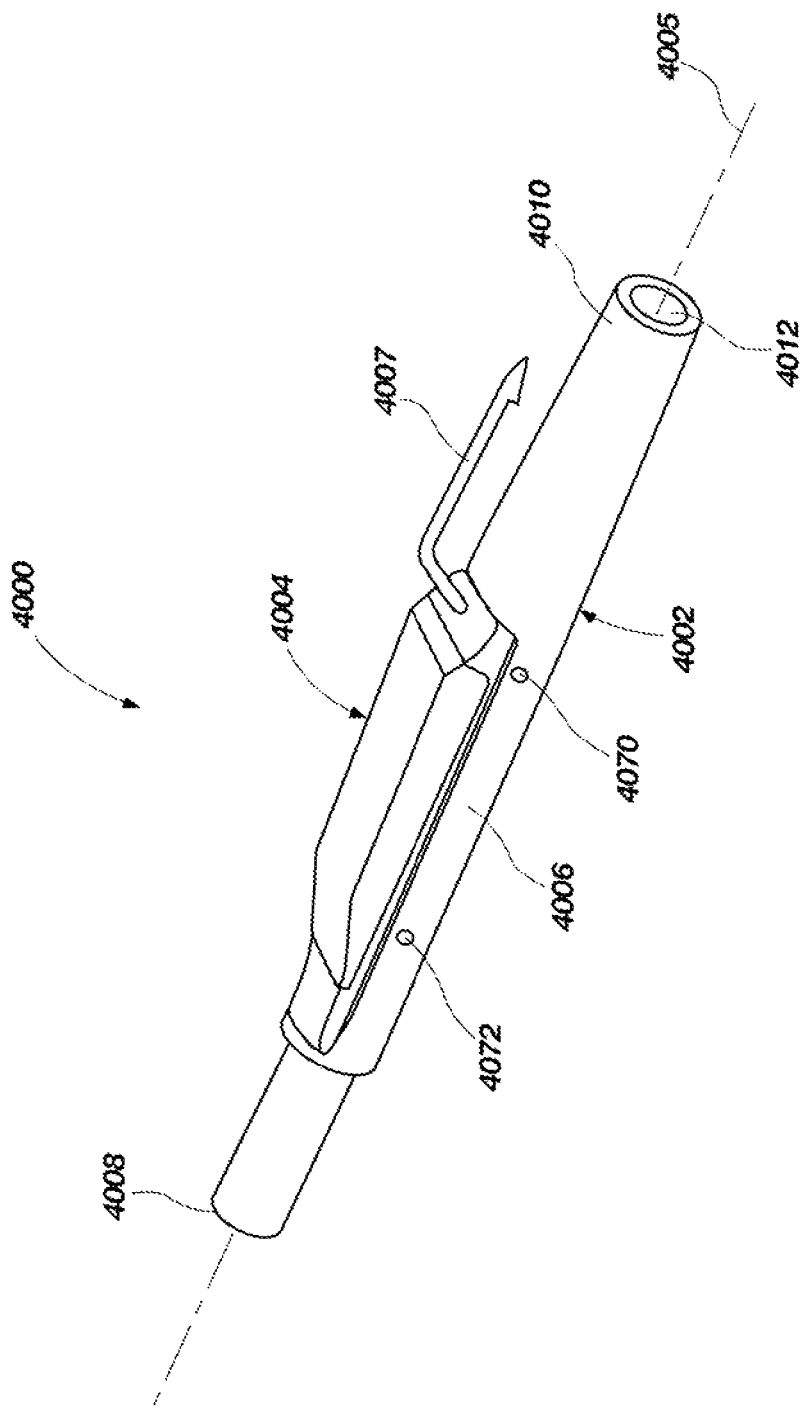
FIG. 40 is a perspective view of an insert assembly pursuant to an embodiment of the present disclosure.
Figure 41:
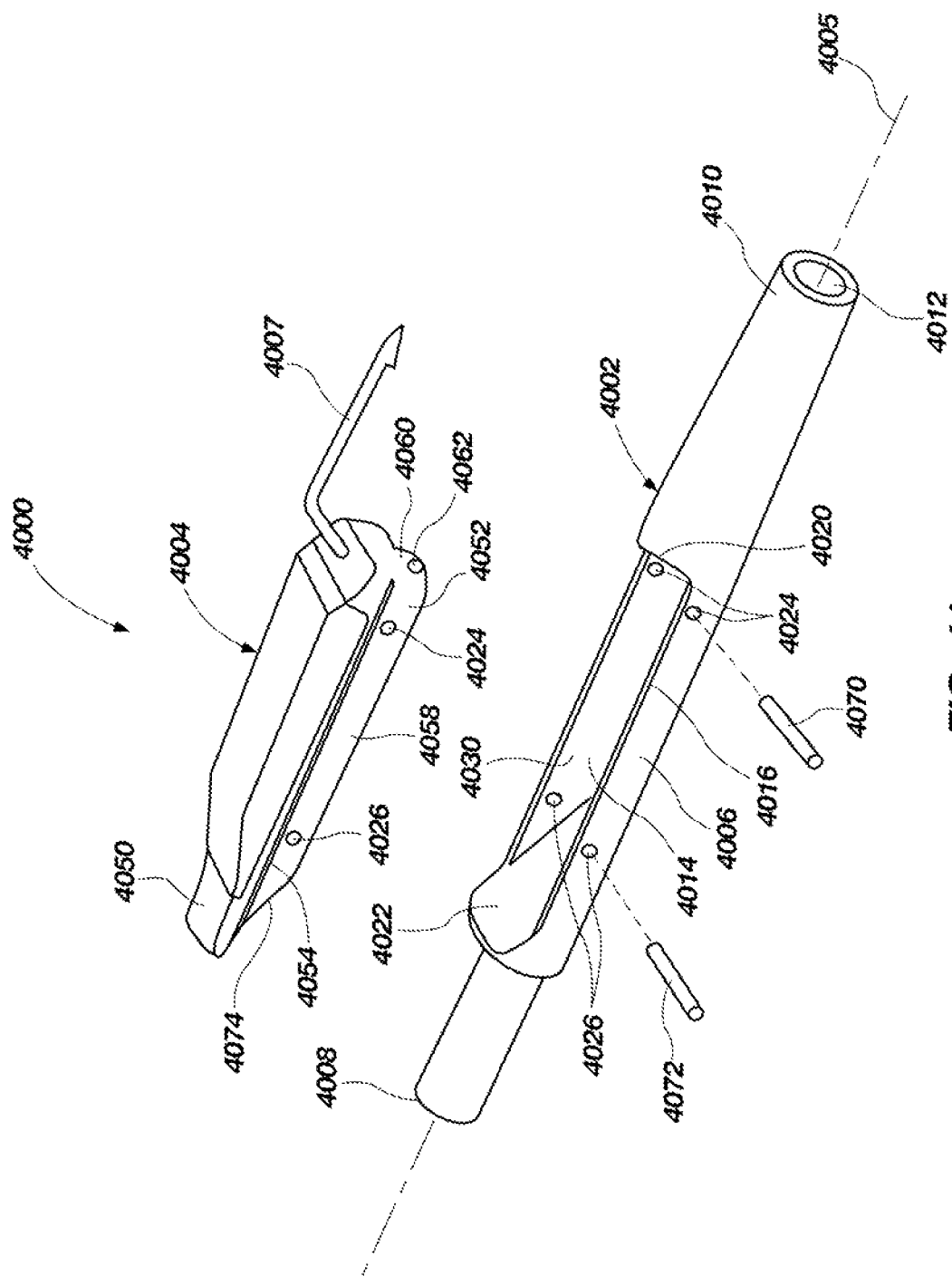
FIG. 41 is an exploded view of the insert assembly of FIG. 40 showing an insert and a payload housing.

Referring now to FIGS. 40 and 41, there is shown an insert assembly 4000 pursuant to an embodiment of the present disclosure. The assembly 4000 may comprise and extend along a longitudinal axis 4005. The assembly 4000 may comprise an insert 4002 and a payload housing 4004. It will be appreciated that the insert 4002 may form an extension of an arrow shaft. Thus, the insert 4002 may be referred to as an "arrow shaft."

The insert 4002 may comprise a main body portion 4006. A shaft 4008 may extend rearwardly from the main body portion 4006. The shaft 4008 may be configured and dimensioned for joining to a shaft of an arrow. In an illustrative embodiment of the present disclosure, the shaft 4008 may threadably engage the shaft of an arrow. In an embodiment of the present disclosure, the shaft 4008 may be secured to the shaft of an arrow using an adhesive.

Figure 42:
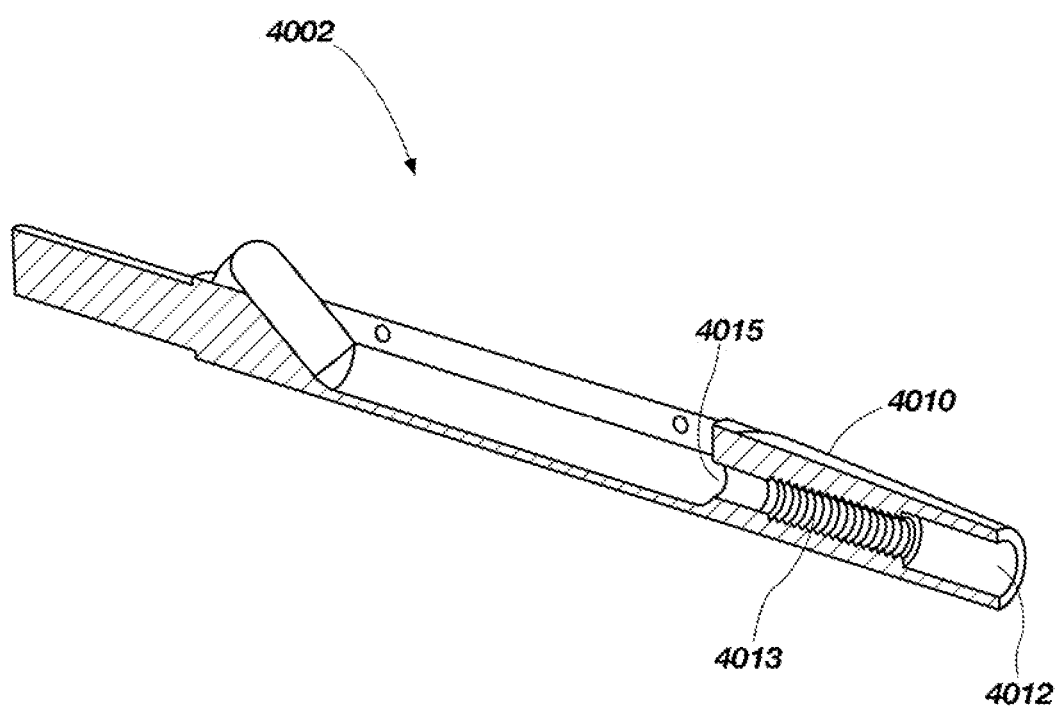
FIG. 42 is a cross-sectional view of an insert pursuant to an embodiment of the present disclosure.

Extending from a forward portion of the main body portion 4006 may be a tapered portion 4010. A bore 4012 may be formed in the tapered portion 4010. The bore 4012 may be configured and adapted for receiving a shaft of a broadhead (not shown). In an embodiment of the present disclosure, the bore 4012 may extend along the axis 4005. In an embodiment of the present disclosure, the bore 4012 may secure a broadhead mechanically, for example, as shown in FIG. 42, the bore 4012 may comprise a female-threaded portion 4013 for engaging a male-threaded end of a broadhead (not shown). In an illustrative embodiment, a shaft of a broadhead may be secured in the bore using an adhesive.

As best seen in FIG. 41, the main body portion 4006 of the insert 4002 may comprise a chamber 4014 for receiving the payload housing 4004. The chamber 4014 may comprise a pair of sidewalls 4016 and 4018 that extend parallel to the longitudinal axis 4005. The sidewalls 4016 and 4018 may extend from a front wall 4020 to a rear wall 4022. An upper portion 4028 of the sidewalls 4016 and 4018, the front wall 4020 and the rear wall 4022 may define a chamber access window 4030 for the chamber 4014.

Figure 43:
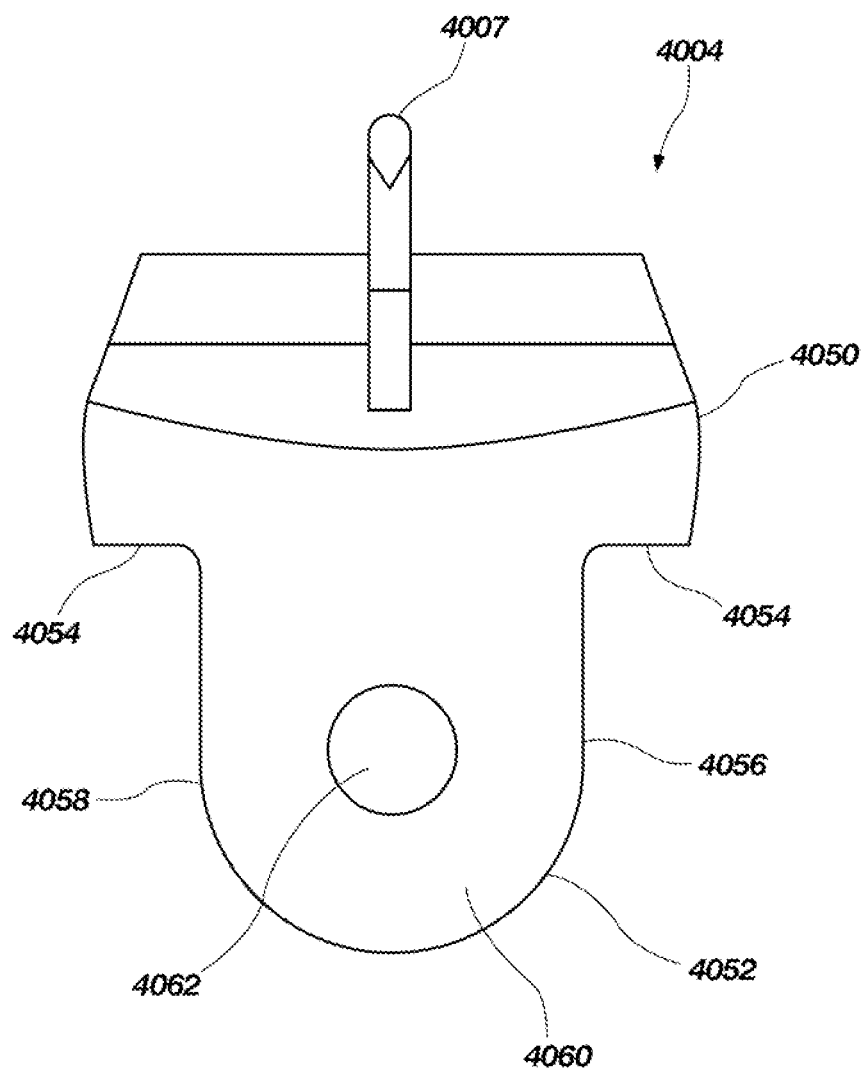
FIG. 43 is a front view of a payload housing pursuant to an embodiment of the present disclosure.

Still referring to FIG. 41, the payload housing 4004 may be made from a relatively strong, lightweight material, such as plastic, resin, composite materials or the like. The housing 4004 may comprise an upper portion 4050 and a lower portion 4052. An animal engagement member 4007 may extend from the housing 4004. The animal engagement member 4007 may secure to the housing 4004 to an animal. The animal engagement member 4007 may comprise at least one hook, a pair of hooks or a similarly functioning structure. The lower portion 4052 may be shaped to correspond to the shape of the chamber 4014 such that the lower portion 4052 may be installed into the chamber 4014. As shown in FIG. 43, the upper portion 4050 may comprise an extended portion 4054 that may abut against the upper portion 4028 of the sidewalls 4016 and 4018 when the housing 4004 is installed in the chamber 4014 as shown in FIG. 40.

As seen in FIGS. 41 and 43, the lower portion 4052 of the payload housing 4004 may comprise a pair of sidewalls 4056 and 4058 extending parallel to each other along the lower portion 4052. The sidewalls 4056 and 4058 may each intersect with a nose portion 4060 of the housing 4004. The nose portion 4060 may comprise a forwardly extending protrusion 4062 that is configured and dimensioned to be installed into a proximal end 4015 of the bore 4012 of the insert 4002 (see FIG. 42).

Referring to FIGS. 41 and 43, a first bore 4024 may extend through both the sidewalls 4016 and 4018 of the insert 4002 and the sidewalls 4056 and 4058 of the payload housing 4004. A second bore 4026 may also extend through both the sidewalls 4016 and 4018 of the insert 4002 and the sidewalls 4056 and 4058 of the payload housing 4004. The first bore 4024 and the second bore 4026 may be perpendicular to the longitudinal axis 4005. The first bore 4024 and the second bore 4026 may be configured and adapted for receiving shear pins 4070 and 4072, respectively. It will be appreciated that although two shear pins 4070 and 4072 are shown, in an embodiment of the present disclosure, only a single shear pin is necessary. The shear pins 4070 and 4072 may be formed of any suitable material, including wood, metal, or plastic.

As perhaps best seen in FIG. 41, a proximal end 4074 of the lower portion 4052 of the payload housing 4004 may be sloped. The slope of the proximal end 4074 may correspond to the slope of the rear wall 4022 of the chamber 4014. As previously explained, the slope of the end 4074 of the lower portion 4052 of the payload housing 4004 may facilitate ejection of the housing 4004 when the insert assembly 4000 is shot into an animal.

Figure 44:
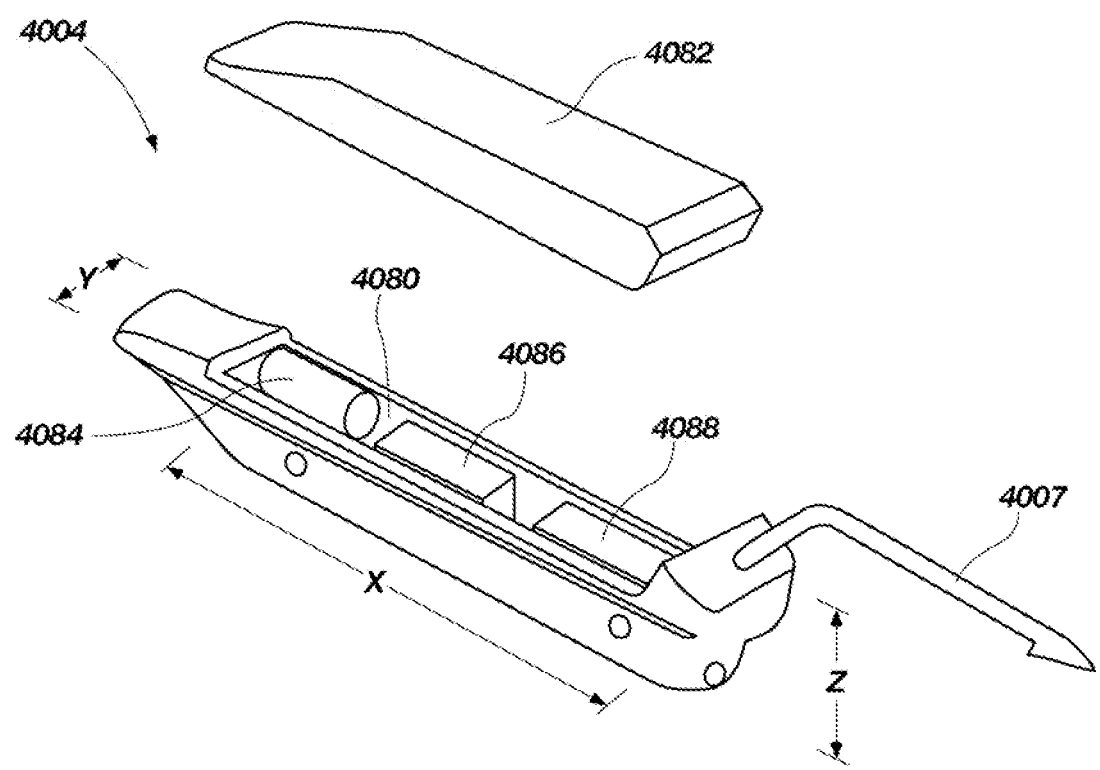
FIG. 44 is an exploded view of a payload housing pursuant to an embodiment of the present disclosure.

Referring now to FIG. 44, there is depicted an exploded view of the payload housing 4004. The payload housing 4004 may comprise a payload compartment 4080 formed in its interior. A cover 4082 may be utilized to enclose the compartment 4080. The cover 4082 may be secured using a fastener such as a screw or the like. The payload compartment 4080 may be installed with various electronic devices. In an illustrative embodiment of the present disclosure, the payload compartment 4080 may comprise a battery 4084 for powering circuitry that can include a GPS receiver 4086, and a radio transmitter 4088.

The installation of the payload housing 4004 (FIG. 44) into the insert 4002 (FIG. 41) will now be described. Typically, prior to inserting the payload housing 4004 into the insert 4002, the insert 4002 will be installed onto the end of the shaft of a hunting arrow. Further, a hunting broadhead may be pre-installed into the bore 4012 of the insert 4002. To install the housing 4004, the lower portion 4052 of the payload housing 4004 may be inserted through the chamber access window 4030 into the chamber 4014. The shear pin 4070 is then installed into the first bore 4024 and the shear pin 4072 is installed into the second bore 4026. It will be appreciated that shear planes for the shear pins 4070 and 4072 may be formed between the insert 4002 and the housing 4004. In an illustrative embodiment of the present disclosure, the shear planes may be parallel to the longitudinal axis 4005 (FIG. 41).

When an arrow having the insert assembly 4000 installed thereon is shot at a target animal, the arrow should penetrate into the animal. The animal engagement member 4007 (FIG. 41) may then penetrate into the hide of the target animal causing the payload housing 4004 to decelerate with respect to the arrow and insert 4002, which continue into the animal. The deceleration of the housing 4004 exerts a force on the shear pins 4070 and 4072 which causes the pins 4070 and 4072 to shear along their respective shear planes on either side of the housing 4004. The housing 4004 is then ejected from the chamber 4014 along the sloped rear surface 4022. The housing 4004 remains affixed to the target animal via the animal engagement member 4007. The GPS receiver 4086 (FIG. 44) inside of the housing 4004 may then receive signals from orbiting satellites, or some other transmitters or such other arrangement for determining position, such that the location of the target animal may be determined. The radio transmitter 4088 inside of the housing 4004 may then transmit the location to a hand held radio receiver, or other human interface device, in possession of the hunter such that the position of the target animal is known. In an embodiment of the present disclosure, the GPS receiver 4086 may be omitted such that the target animal may be found using radio location techniques.

Figure 45:
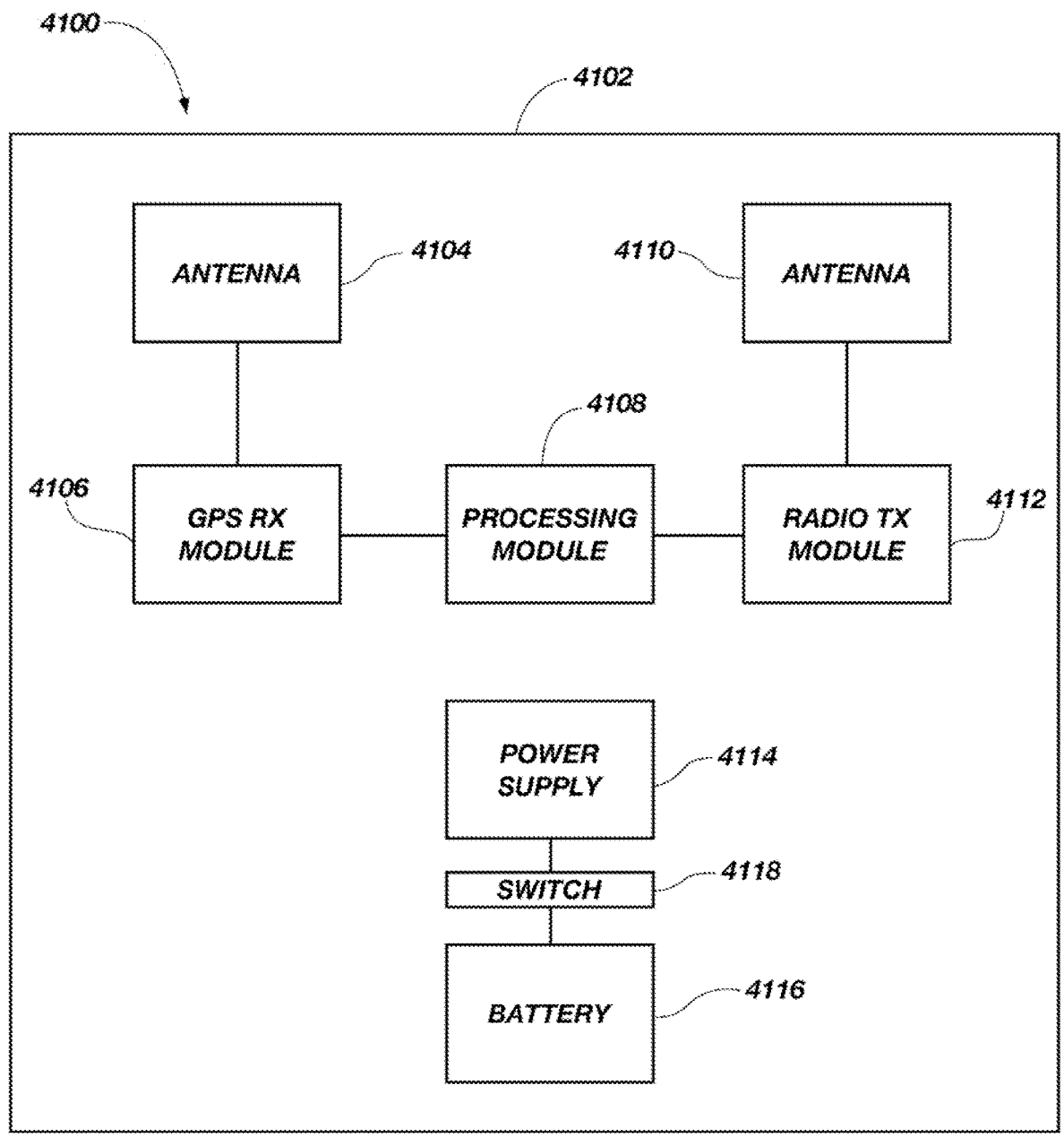
FIG. 45 is a block diagram of a GPS receiver and radio transmitter suitable for use with the present disclosure.

Referring now to FIG. 45, there is depicted a block diagram 4100 for a payload 4102 that may be installed into the payload compartment 4080 formed in the payload housing 4004. The payload 4102 may comprise a first antenna 4104 for receiving signals from a spaced-based global positioning system. The first antenna 4104 may be connected to a GPS RX module 4106. The GPS RX module 4106 may determine the position of the payload housing 4004 based upon signals received at the first antenna 4104. The GPS RX module 4106 may be referred to herein as a "GPS receiver." The processing module 4108 may be provided with location information from the GPS RX module 4106. The processing module 4108 may provide the location information to a radio TX module 4112. The radio TX module 4112 may broadcast the location information using a second antenna 4110. The radio TX module 4112 may be referred to herein as a "radio transmitter." A power supply 4114 connected to a battery 4116 may supply the necessary power for the operation of the GPS RX module 4106, the processing module 4108, and the radio TX module 4112.

In an embodiment of the present disclosure, the GPS RX module 4106, the processing module 4108, and the radio TX module 4112 may be mounted on a circuit board (not shown). In an embodiment of the present disclosure, at least one of the first antenna 4104 and the second antenna 4110 may be mounted on the board.

An on/off switch 4118 may preserve the battery 4116. In particular, the switch 4118 may turn on, i.e., allow current flow from the battery 4116, only when the payload housing 4004 is separated from the chamber 4014 of the insert 4002. The switch 4118 may turn off, i.e., prevent current flow from the battery 4116, when the payload housing 4004 is installed in the chamber 4014 of the insert 4002. The switch 4118 may take a variety of forms, including a magnetically operated switch or a mechanically operated switch.

Referring now to FIG. 44, the payload compartment 4080 may have a length, x, a width, y, and a depth, z. In an embodiment of the present disclosure, the length x of the payload compartment 4080 may be between about 3 centimeters and 10 centimeters. In an embodiment of the present disclosure, the width y of the payload compartment 4080 may be between about 0.5 centimeters and 1.5 centimeters. In an embodiment of the present disclosure, the depth z of the payload compartment 4080 may be between about 0.5 centimeters and 1.5 centimeters.

Referring now to FIGS. 44 and 45, in an embodiment of the present disclosure, the GPS RX module 4106, the processing module 4108, the radio TX module 4112, the power supply 4114 and the battery 4116 may be dimensioned to all fit within the payload compartment 4080. In an embodiment of the present disclosure, the GPS RX module 4106, the processing module 4108, the radio TX module 4112, the power supply 4114, the battery 4116, and the first antenna 4104 and the second antenna 4110 may be dimensioned to all fit within the payload compartment 4080. In an embodiment of the present disclosure, at least one of the first antenna 4104 and the second antenna 4110 are external to the payload compartment 4080.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software code, sometimes referred to as computer readable instructions, for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 46:
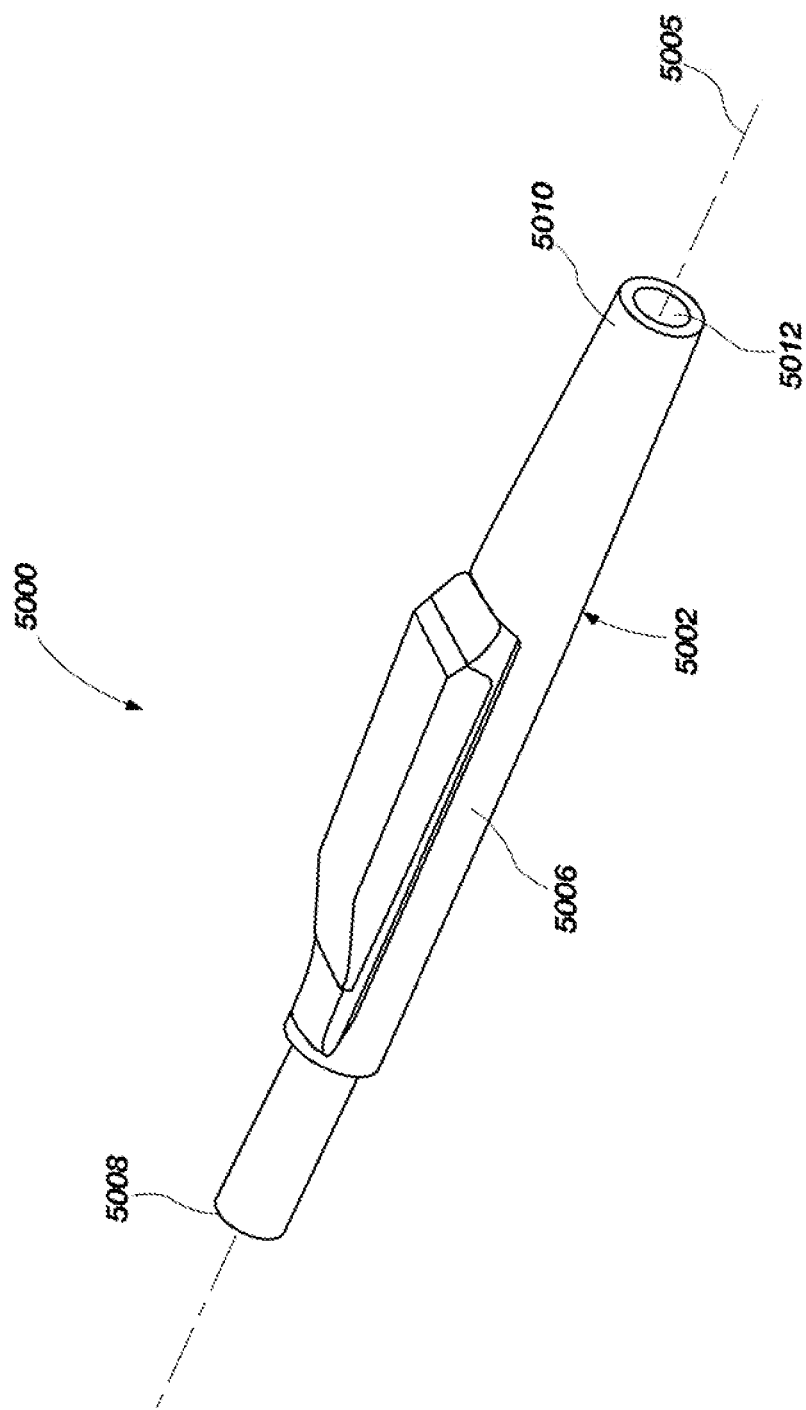
FIG. 46 is a perspective view of a compensator assembly pursuant to an embodiment of the present disclosure.
Figure 47:
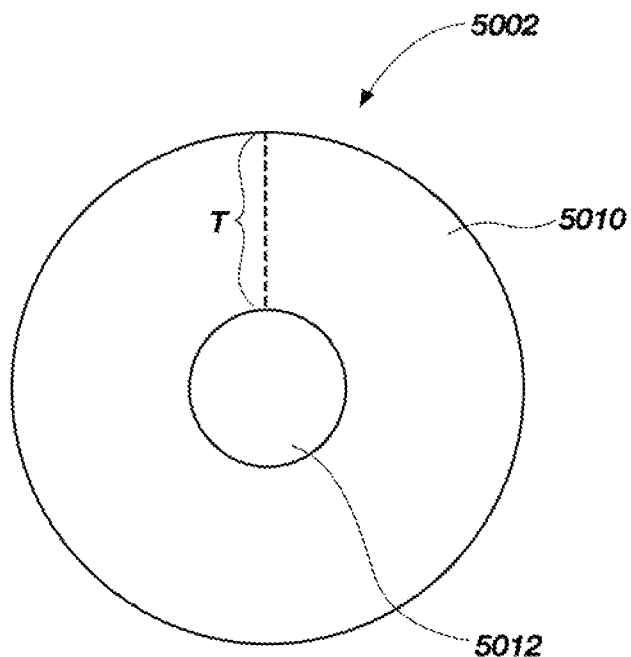
FIG. 47 is an end view of the compensator assembly of FIG. 46.

Referring now to FIGS. 46 and 47, there is shown an insert assembly 5000 pursuant to an embodiment of the present disclosure. The assembly 5000 may comprise and extend along a longitudinal axis 5005. The assembly 5000 may comprise a compensator 5002. It will be appreciated that the compensator 5002 may form an extension of an arrow shaft. Thus, the compensator 5002 may be referred to as an "arrow shaft."

The compensator 5002 may comprise a main body portion 5006. A shaft 5008 may extend rearwardly from the main body portion 5006. The shaft 5008 may be configured and dimensioned for joining to a shaft of an arrow. In an illustrative embodiment of the present disclosure, the shaft 5008 may threadably engage the shaft of an arrow (as shown in selected figures). In an embodiment of the present disclosure, the shaft 5008 may be secured to the shaft of an arrow using an adhesive. In an embodiment of the present disclosure, the shaft 5008 may be integral with the shaft of an arrow, being formed as a single unitary piece.

Still referring to FIGS. 46 and 47, extending from a forward portion of the main body portion 5006 may be a tapered portion 5010. In another embodiment of the present invention, the tapered portion 5010 may extend from the main body 5006 with a uniform thickness, without being tapered. A bore 5012 may be formed in the tapered portion 5010. The bore 5012 may be configured and adapted for receiving a shaft of a broadhead (not shown in FIGS. 46 and 47). In an embodiment of the present disclosure, the bore 5012 may extend along the axis 5005. In an embodiment of the present disclosure, the bore 5012 may secure a broadhead mechanically, for example, the bore 5012 may comprise a female-threaded portion for engaging a male-threaded end of a broadhead (not shown in FIGS. 46 and 47). In an embodiment, a shaft of a broadhead may be secured in the bore using an adhesive. In an embodiment of the present disclosure, a shaft of a broadhead may be integral with tapered portion 5010, being formed as a single unitary piece.

As seen in FIG. 47, the tapered portion 5010 of the compensator 5002, which includes the bore 5012, also includes a thickness T, measured from a wall of the bore 5012 to the outer surface of the tapered portion 5010. The thickness T of the tapered portion 5010 may be, for example, 2 mm, 5 mm, 10 mm, or range from 1 mm to 12 mm. The length of the compensator, measured along, axis 5005 (FIG. 46) can also vary according to the desired dimensions and performance of the compensator 5002.

Figure 48:
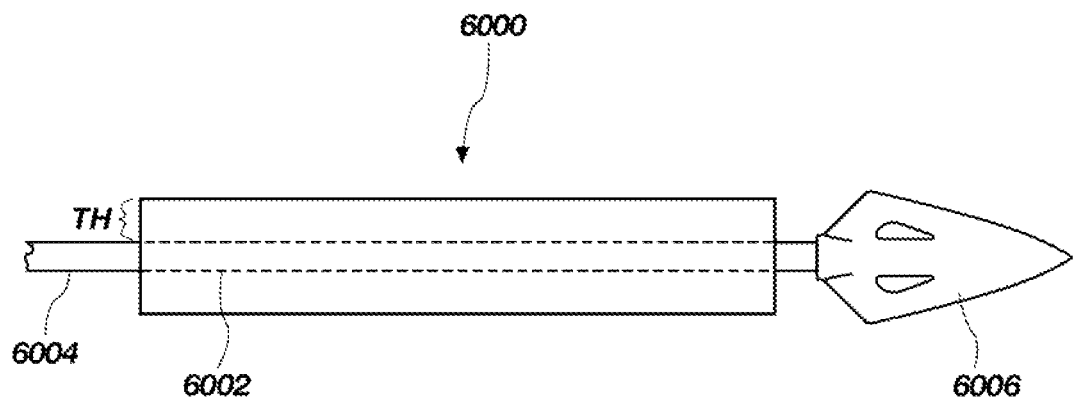
FIG. 48 is a side view of another compensator assembly pursuant to an embodiment of the present disclosure.

In other illustrative embodiments of the present disclosure, the compensator may have a generally cylindrical shape, or have a triangular cross-section, square cross-section, or any other desired cross-sectional shape. As seen in schematic representation of FIG. 48, a compensator 6000 may have a uniform cylindrical shape with a substantially uniform thickness TH throughout the length of the compensator 6000. In this embodiment the compensator can be formed as a sleeve, having a bore 6002 which receives a shaft 6004 of an arrow. The arrow can also include a broadhead 606 at a terminating end. The compensator 6000 may also include a female-threaded portion for engaging a male-threaded end of a broadhead 6006. In an embodiment, the shaft 6004 of a broadhead 6006 may be secured in the bore 6002 using an adhesive. In an embodiment of the present disclosure, the shaft 6004 of the broadhead 6006 may be integral with the compensator 6000, being formed as a single unitary piece.

The compensators 5000 or 6000 (FIGS. 47 and 48, respectively) can be used to house animal tracking devices for hunting or other tracking activities. A key feature of the compensators 5000 and 6000 are their increased diameters T and TH, with respect to the arrow shafts 5008 and 6004. This increased thickness can be used to "compensate" the increased weight of the compensator itself and any added weight, by increasing the angle of trajectory of the arrow when shot by a user. The added weight may included, for example, a radio transmitter, a GPS receiver, an animal engagement member, a trackers, etc. This function will be explained in more detail below.

Figures 49A, 49B:
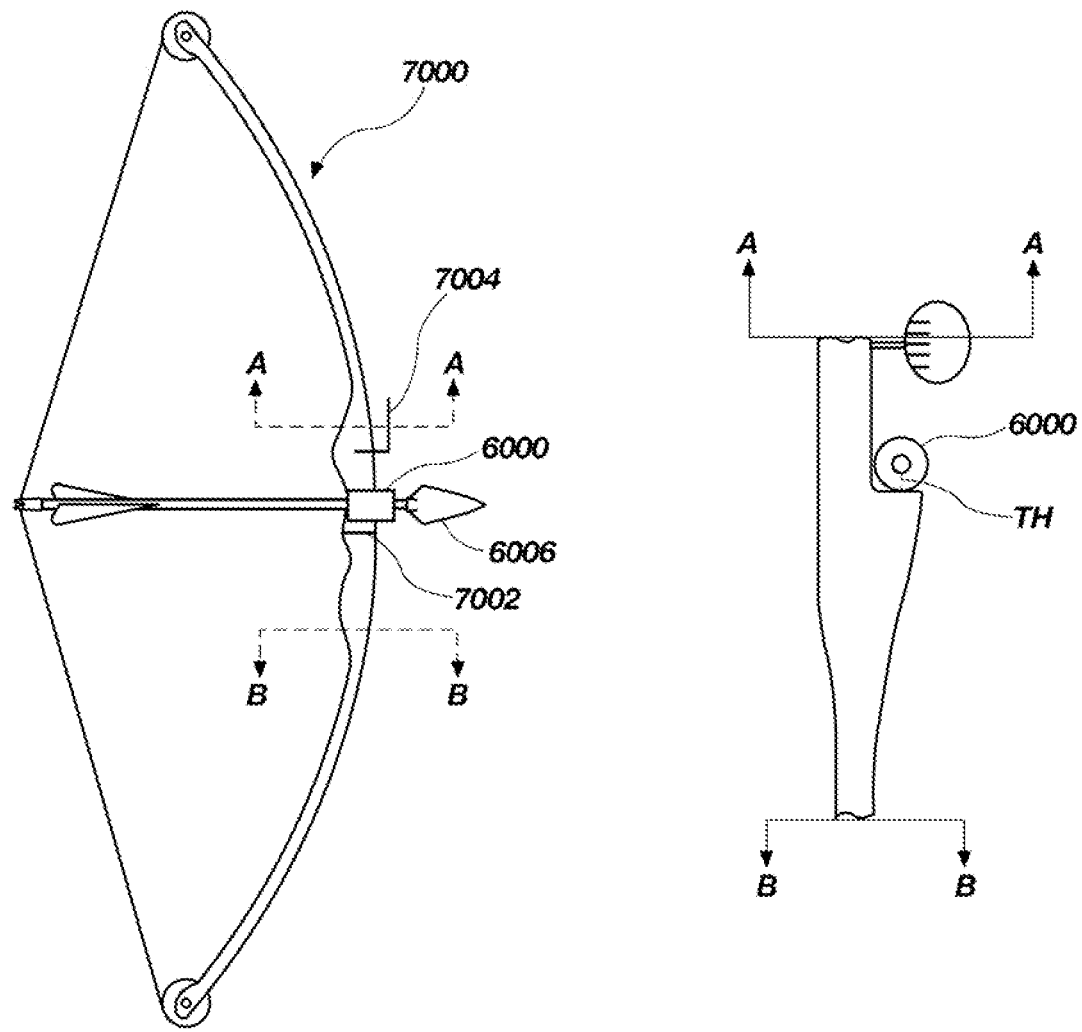
FIG. 49a is a side view of a bow and a compensator assembly pursuant to an embodiment of the present disclosure.
FIG. 49b is cut away view of the a bow and a compensator assembly along the A-A plane and B-B plane.

As seen in FIGS. 49a and 49b, a conventional compound bow 7000 (or any other type of bow, if desired) includes an arrow rest 7002 and a sight 7004. Conventionally, a user can nock an arrow and set an end portion of an arrow on the rest 7002 as the user aims at a desired target. The user will then peer through the sight 7004, which is calibrated before actual use, to align the arrow shot with a desired target. The compensators 5000 and 6000 have been designed and manufactured such that the thicknesses T and TH of the compensators 5000 and 6000, relative to the corresponding thickness of a standard arrow shaft, raises and increases the trajectory of the arrow when shot from the rest 7002. The thickness T and TH have also been specifically designed and manufactured to compensate for the added weight of the compensators 5000 and 6000 and any other integrated product, such as a tracker, such that the same sight 7004 calibration used for a conventional arrow can be used with the same accuracy with an arrow having a compensator 5000 or 6000. Essentially, and advantageously, the illustrated disclosure allows a user to use a conventional bow 7000 with a standard calibrated sight 7004, to shoot both a standard arrow and an arrow with a compensator 5000 or 6000, without the need to re-calibrate the sight 7004 to compensate for any added weight of the compensator 5000 or 6000 with an integrated product, such as a tracker.

FIG. 50 further illustrates the difference in shooting trajectory 8004 with a standard arrow versus the shooting trajectory 9004 of an arrow having a compensator 6000. It should be noted that the illustration of FIG. 50 is schematic, exaggerated to better visualize the differences in shooting trajectory to improve shooting accuracy.

Figure 50A:
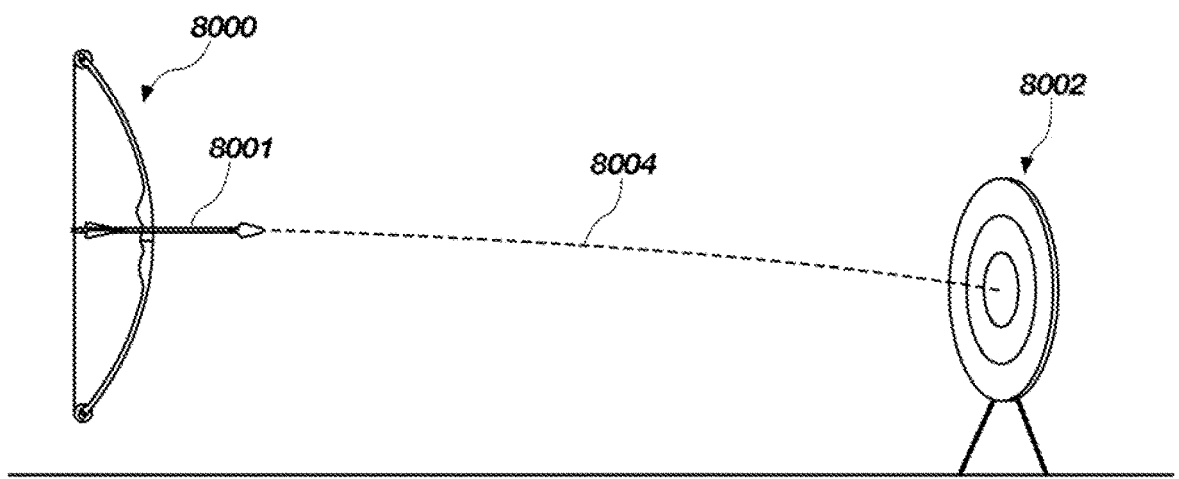
FIG. 50a is a schematic view of a conventional arrow trajectory without using a compensator assembly.

In FIG. 50a, a bow 8000 is shown shooting a standard arrow 8001 at a target 8002 with a resulting shooting trajectory 8004. It can be seen that the shallow trajectory 8004 of the arrow enables the arrow 8001 to hit the desired location in the middle of the target 8002. The user aims the bow using a sight, which is calibrated for the specific conditions which the bow 8000 is using. For example, the diameter and length of the arrow affect the angle with which the arrow 8001 leaves the bow 8000, and therefore affect the trajectory 8004. The arrow 8000 may be of any standard arrow diameter, from the larger diameters about 10 mm, down to smaller diameters more suited for hunting, such as about 4 mm to about 6.5 mm.

Figure 50B:
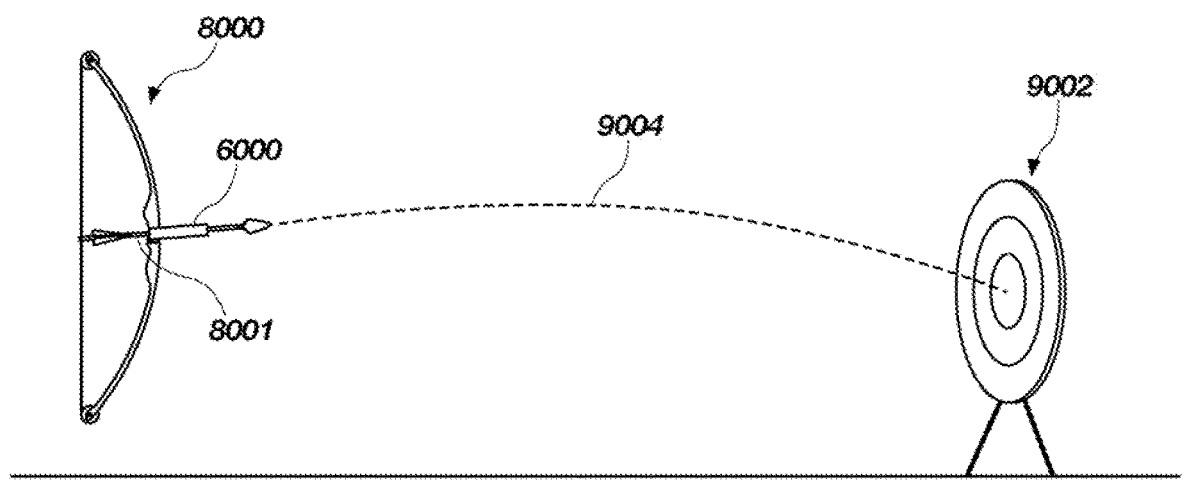
FIG. 50b is a schematic view of an arrow trajectory using a compensator assembly pursuant to an embodiment of the present disclosure.

Still referring to FIG. 50a, the length of the arrow is chosen based on the draw of the bow 8000, and generally varies between approximately 35 cm (about 13.5 inches) and approximately 79 cm (about 31.5 inches) Again, the length of arrow and diameter of the shaft determine the angle at which the arrow leaves the bow. The angle combined with the weight of the arrow and the force of the bow determine the trajectory 8004 which the arrow follows. In FIG. 50b, the same bow 8000 is illustrated, shooting an arrow 8001 having the compensator 6000. The arrow 8001 has the same length as the arrow 8001 in FIG. 50a. The arrow, however, may have an increased weight due to carrying an additional load, such as an animal tracking mechanism and/or animal engagement member.

The increased diameter of the compensator 6000 having a thickness TH modifies the arrow trajectory 9004 before hitting the target 9002 at the same location as the standard arrow with the shooting trajectory shown in FIG. 50a. The thickness TH of compensator 6000 may be from about 1 mm to about 12 mm, and in some embodiments is about 2 mm, about 5 mm, or about 10 mm, with TH being the difference between the diameter of the arrow and the diameter of the arrow with the compensator. TH is chosen such that the additional thickness TH of the compensator 6000 causes the arrow to leave the bow with a steeper angle to compensate for the greater weight of the arrow from a load the arrow is carrying, or from the compensator itself (which may contain an animal tracking device, animal engagement member, or other load). As such, the arrow hits the target at the same location as it would without the additional load and compensator. As seen in both illustrations, 50a and 50b, with the additional thickness TH of the compensator, a user will use the same sight calibration to hit the same location on the target, despite the increased weight of the arrow and compensator.

Therefore, the compensators 5000 and 6000 can be used by a user with a heavier arrow without having to re-calibrate the sights 7004 of the bow 7000 or 8000, enabling a user to use standard arrows and arrows equipped with compensators 5000 or 6000, without the need to take the time and energy to re-calibrate the sights 7004. By bypassing the need to re-calibrate the sights 7004, a user can also save money and opportunity, as many users may not have the skill or equipment to properly and accurately calibrate the sights of a bow.

In other embodiments of the present disclosure, compensators 5000 and 6000 can be added to standard length arrows, by the means identified above. Alternatively, compensators 5000 and 6000 can be built integrally with an arrow. In other embodiments, as discussed above, the compensators may also be removable, thus enabling a user to modify a standard arrow to add or remove a compensator 5000 or 6000 at anytime, to adapt to a specific or desired situation.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of any single foregoing disclosed embodiment. Thus, the following claims are hereby incorporated into this Detailed Description by this reference, with each claim standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for adding a payload to an arrow, the arrow having a shaft, said system comprising:
   a chamber formed within the arrow shaft in a distal section of the arrow shaft;
   wherein the distal section of the arrow shaft has a diameter greater than that of a proximal section of the arrow shaft;
   a chamber access opening;
   a housing;
   a compression fitting for removably securing the housing in the chamber through the chamber access opening; and
   wherein the diameter of the distal section of the arrow shaft is chosen such that when the distal section of the arrow shaft is rested upon an arrow rest of a bow, it raises a trajectory of the arrow a sufficient amount to enable a user to aim the arrow as if a weight of the housing had not been added.

2. The system of claim 1, wherein the compression fitting for removably securing the housing within the chamber comprises a compression fitting which is inserted into the chamber in the arrow.

3. The system of claim 2, wherein the compression fitting is secured to a retaining lip placed within the chamber in the arrow shaft.

4. The system of claim 3, wherein said retaining lip is secured within the chamber by friction.

5. The system of claim 1, further comprising at least one animal engagement member extending from the housing.

6. The system of claim 5, wherein the at least one animal engagement member comprises a hook.

7. The system of claim 1, wherein the compression fitting for removably securing the housing within the chamber comprises a head designed to fit within one or more retaining lips located in the chamber of the arrow.

8. The system of claim 7, wherein said head comprises a wider portion at a distal end of the head designed to be secured by the one or more retaining lips located in the chamber of the arrow and a narrower portion located in back of the wider portion and wherein the one or more retaining lips are located around the narrower portion when the housing is secured within the arrow.

9. The system of claim 1, wherein said housing comprises a radio transmitter.

10. The system of claim 1, wherein said housing comprises a GPS receiver.

11. The system of claim 1, wherein said housing comprises a battery.

\* \* \* \* \*